(12) United States Patent
Takeda et al.

(10) Patent No.: US 11,048,084 B2
(45) Date of Patent: Jun. 29, 2021

(54) HEAD-MOUNTED DISPLAY DEVICE

(71) Applicant: SEIKO EPSON CORPORATION, Tokyo (JP)

(72) Inventors: Takashi Takeda, Suwa (JP); Toshiyuki Kasai, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/727,032

(22) Filed: Dec. 26, 2019

(65) Prior Publication Data

US 2020/0209625 A1 Jul. 2, 2020

(30) Foreign Application Priority Data

Dec. 27, 2018 (JP) .............................. JP2018-244291

(51) Int. Cl.
*G06F 3/01* (2006.01)
*G02B 27/01* (2006.01)
*G06T 19/00* (2011.01)

(52) U.S. Cl.
CPC ............ *G02B 27/017* (2013.01); *G06F 3/011* (2013.01); *G06T 19/006* (2013.01); *G02B 2027/014* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| 2017/0108918 | A1* | 4/2017 | Boesen | G06F 1/163 |
| 2017/0248789 | A1* | 8/2017 | Yokoyama | G02B 6/124 |
| 2017/0257620 | A1 | 9/2017 | Takeda et al. | |
| 2018/0217380 | A1* | 8/2018 | Nishimaki | G02B 27/0176 |
| 2020/0150443 | A1* | 5/2020 | Ebert | G02B 27/0176 |

FOREIGN PATENT DOCUMENTS

JP 2018-054976 A 4/2018

* cited by examiner

*Primary Examiner* — Joseph R Haley
(74) *Attorney, Agent, or Firm* — Oliff PLC

(57) ABSTRACT

In a first display device and a second display device of a display mechanism, a first video image and a second video image having mutually different display contents are visually recognized, and further, display positions of the first video image and the second video image can be changed by first and second posture adjustment mechanisms that are a posture adjustment mechanism.

11 Claims, 20 Drawing Sheets

HEAD-MOUNTED DISPLAY DEVICE

The present application is based on, and claims priority from JP Application Serial Number 2018-244291, filed Dec. 27, 2018, the disclosure of which is hereby incorporated by reference herein in its entirety.

BACKGROUND

1. Technical Field

The present invention relates to a head-mounted display device, which is representative of a head-mounted display.

2. Related Art

A head-mounted display device, such as a head-mounted display as described in JP-A-2018-54976, for example, is known in which a pair of left and right display devices are provided so as to allow stereoscopic video recognition. By providing first and second common display areas that perform image display of common content to left and right eyes, and an augmented display area that displays images unique to at least one of the left and right, various formats of image display are made possible while causing the image display to be perceived as a large image display. Note that the head-mounted display is also described as an HMD in the following.

However, in a configuration such as that exemplified in JP-A-2018-54976, for example, it is necessary to adjust the position of the left and right display with a high degree of precision so that the image being displayed to the left and right eyes is recognized as the common content. In this case, there is a possibility that it is difficult to respond to demands for maintaining optical performance, miniaturization, and the like, while increasing an amount of information displayed by individually displaying various pieces of information, for example.

SUMMARY

A head-mounted display device according to an aspect of the present disclosure includes a display mechanism including a first display device and a second display device configured to display a first video image and a second video image having mutually different display contents, and a posture adjustment mechanism configured to change a display position of a video image corresponding to one of the first video image and the second video image, by adjusting a posture of at least one of the first display device and the second display device.

DESCRIPTION OF EXEMPLARY EMBODIMENTS

First Embodiment

A head-mounted display device according to a first embodiment of the present disclosure will be described below in detail with reference to FIG. 1 and the like.

Figure 1:
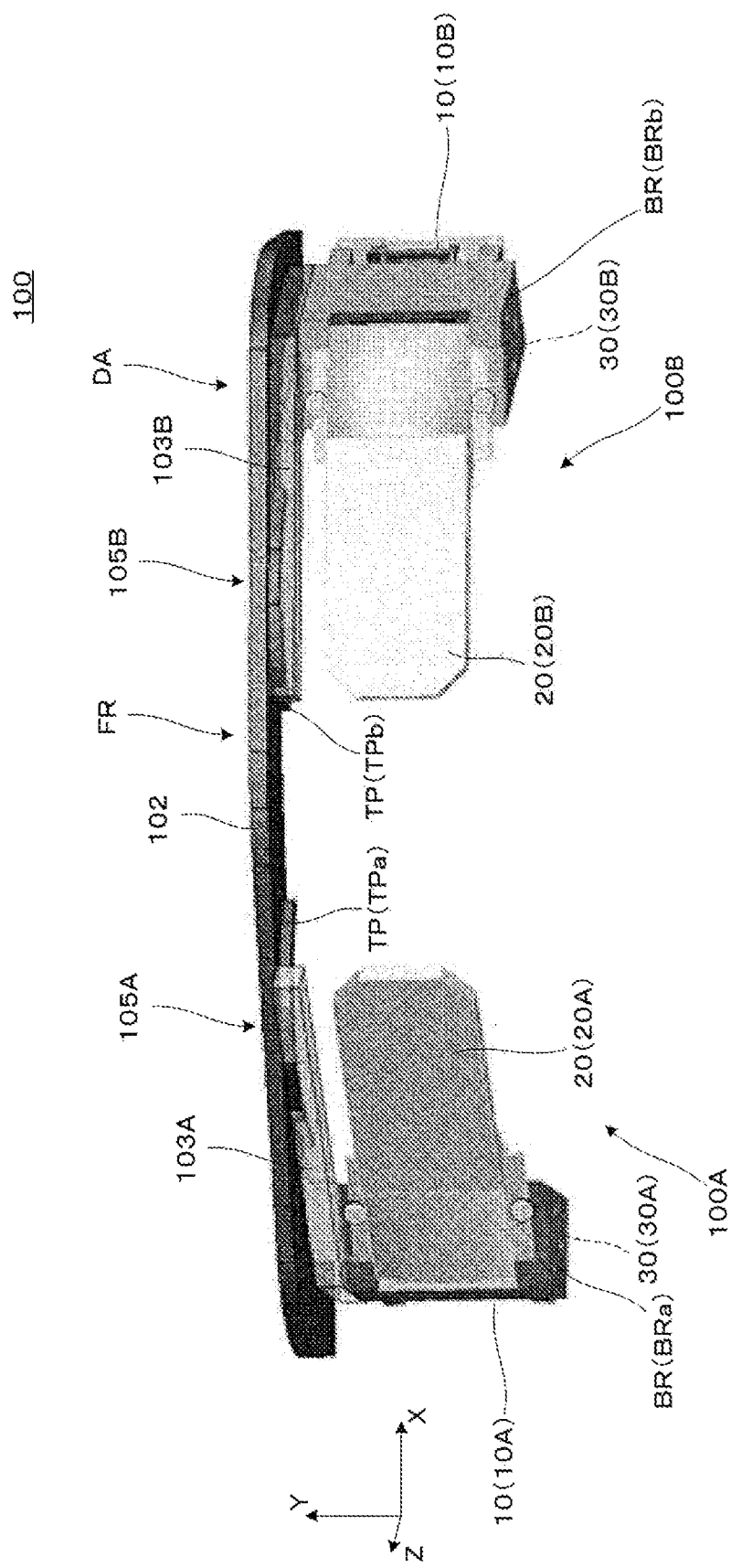
FIG. 1 is a conceptual perspective view illustrating a head-mounted display device according to a first embodiment.
Figure 2:
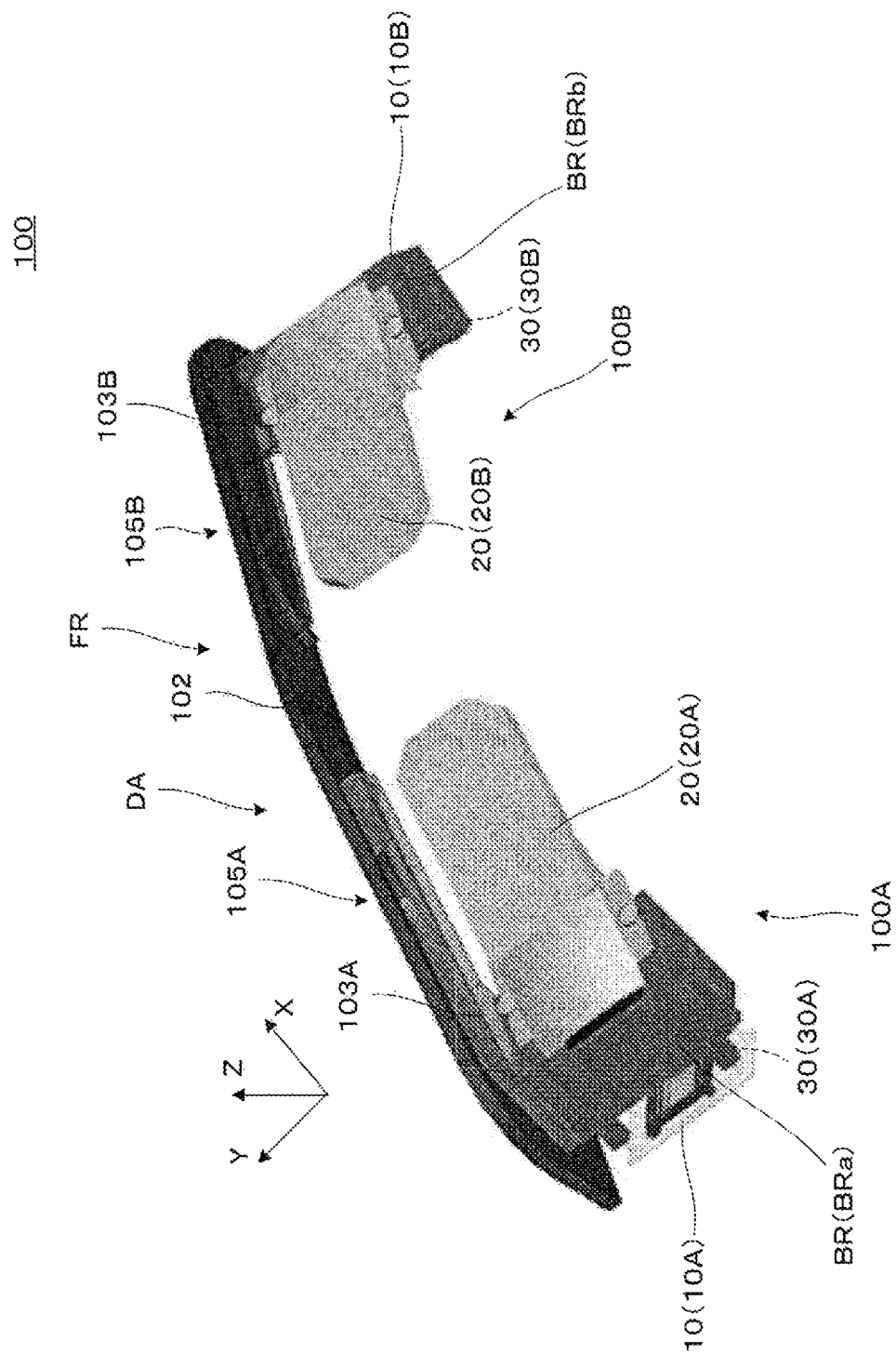
FIG. 2 is a conceptual perspective view illustrating the head-mounted display device as seen from another angle.

For example, as illustrated in FIG. 1, FIG. 2, and the like, a head-mounted display device 100 of the present embodiment is a head-mounted display (HMD) having a visual appearance of eyeglasses, and is a virtual display device capable of causing an observer or user wearing the head-mounted display device 100 to visually recognize image light (image light) by a virtual image, and allowing the observer to visually recognize or observe an external world image in a see-through manner. The head-mounted display device 100 is provided with a first display device 100A, a second display device 100B, and a frame portion FR.

Further, in FIG. 1 and the like, only an optical system, such as the first display device 100A, a lens tube BR that houses the optical system, and a frame portion FR that supports the optical system are illustrated, and other portions are not illustrated, but in addition to these components, various structural components including each of the above-described components are supported and housed as a result of the head-mounted display device being covered by cover-shaped outer packaging members (case members), for example. Further, the head-mounted display device can be worn like eyeglasses, as a result of including temple portions (temples) or the like that are disposed on both left and right ends of the outer packaging members or the frame portion FR and that extend to the rear.

Of the components of the head-mounted display device 100 illustrated in the drawings, first, the first display device 100A and the second display device 100B are portions that respectively form a virtual image for the left eye and the right eye, and are respectively configured by the light-guiding device 20 that covers the front of the eyes of the observer, as well as an optical system for image formation, such as an image display device (video element) 10, a projection lens 30, and the like. Further, the image display device 10, the projection lens 30, and the light-guiding device 20 are in a state of being integrally assembled with the lens tube BR that houses the optical elements configuring the projection lens 30. For example, the image display device 10A, a projection lens 30A, and a light-guiding device 20A that configure the first display device 100A are fixed while maintaining an arrangement relationship with each other by a lens tube BRa. Similarly, the image display device 10B, a projection lens 30B, and a light-guiding device 20B that configure the second display device 100B are fixed by a lens tube BRb.

Further, in the present embodiment, the first display device 100A and the second display device 100B each function individually as a virtual display device, and in particular, can display individual content. Here, the video image displayed by the first display device 100A is referred to as a first video image, and the video image displayed by the second display device 100B is referred to as a second video image. In addition, in the present embodiment, the first display device 100A and the second display device 100B are combined to form a display mechanism DA. In other words, the display mechanism DA includes the pair of the left and right first display device 100A and second display device 100B that display the first video image and the second video image of mutually different display content.

Next, of the head-mounted display device 100, the frame portion FR includes a main frame 102 and a pair of left and right first and second subframes 103A and 103B.

Of the frame portion FR, the main frame 102 is a long thin member that is bent into a U-shape in plan view, and is provided connected to both the pair of the left and right first display device 100A and second display device 100B via the first and second subframes 103A and 103B. When the observer is wearing the head-mounted display device 100, the main frame 102 is maintained in a fixed state with respect to the observer, and supports the first display device 100A and the second display device 100B.

Of the frame portion FR, the pair of left and right first and second subframes 103A and 103B are plate-like members and are movably engaged with the main frame 102 that is fixed to the observer side when worn. More specifically, the first posture adjustment mechanism 105A is provided between the main frame 102 and the first subframe 103A as a connecting mechanism that rotatably fits along a groove provided in an arc shape. Similarly, the second posture adjustment mechanism 105B is provided between the main frame 102 and the second subframe 103B. Note that the first and second posture adjustment mechanisms 105A and 105B that are connection mechanisms are described in detail below, with reference to FIG. 5, FIG. 6, and the like. Meanwhile, the first and second subframes 103A and 103B are respectively connected to and support and fix the corresponding first and second display devices 100A and 100B.

According to the configuration described above, when the head-mounted display device 100 is being worn, the first and second display devices 100A and 100B are supported by the frame portion FR and can rotate.

Note that, in the drawings, a Z direction indicates a front direction when the head-mounted display device 100 is being worn, and is a direction defined with reference to the main frame 102 that is fixed when worn, for example. In addition, in an in-plane direction perpendicular to the Z direction, that is, the in-plane direction of a plane having the Z direction as the normal direction, the horizontal direction in which the eyes are aligned side by side is denoted by an X direction and the vertical direction is denoted by a Y direction. As a typical example, when the first and second display devices 100A and 100B are installed and fixed in a standard position in which the image is projected to the front by the first and second posture adjustment mechanisms 105A and 105B, a case is assumed in which the Z direction indicates the normal direction of a surface of an eyebox for the display devices 100A and 100B, and the surface of the eyebox is a surface that is formed by an X direction vector and a Y direction vector. Note that, in the configuration of the present embodiment, the position of the eye EY is a position of a surface of an eyebox or of an eye ring shape, a detailed example of which will be described below with reference to FIG. 8. Further, in this case, as an example, a case is assumed in which the first and second display devices 100A and 100B are rotated along the alignment of the eyes. In other words, with the Y direction as the axial direction, the first and second display devices 100A and 100B are rotated in the XY plane. A center of rotation at this time is the center of the observer's pupil.

Figure 3:
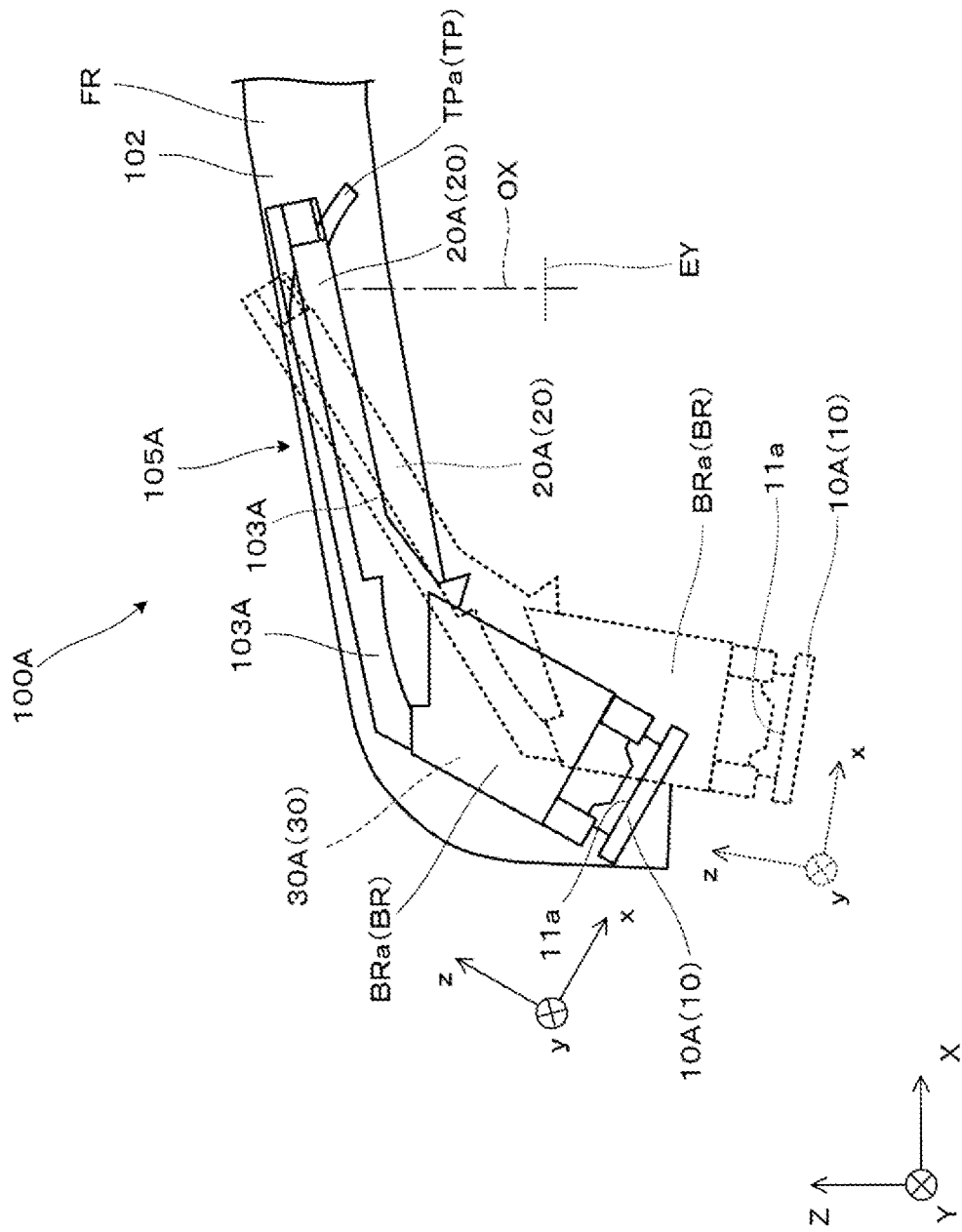
FIG. 3 is a bottom surface view for describing a rotational movement of a first display device.

The configuration of each component of the first display device 100A and a rotation operation of the first display device 100A will be described below with reference to a bottom surface view illustrated in FIG. 3. Note that the second display device 100B is the same as the first display device 100A, and illustrations and descriptions thereof are thus omitted here.

The first display device 100A is a device for causing the first video image to be displayed for the right eye. As described above, the first display device 100A is a display optical system that forms an image to be visually recognized, as a result of including the image display device 10A, that is, the image display device 10, the projection lens 30A, that is, the projection lens 30, and the light-guiding device 20A, that is, the light-guiding device 20. Furthermore, each of these components is integrated by being assembled with the lens barrel Bra, that is the lens barrel BR. Note that the position assumed to be the position of the eye EY virtually illustrated in the drawings is a standard position in which the image is projected to the front by the first display device 100A, and also corresponds to the surface of the eyebox at this position. In this case, an optical axis OX having the eye EY of the observer as its reference extends in the Z direction. Further, as will be described in detail below, the posture of the first display device 100A is changed such that the angle is changed while maintaining passage of a principal ray PR through a center point that is a center position of the eyebox.

The image display unit 10 (the image display unit 10A) can be formed by an image display element (a video element) configured by a self-emitting light emitting element, such as an organic EL element, for example. Further, in addition to the image display element (the video element) that is a transmissive spatial light modulating device, for example, a configuration may be employed that includes an illumination device (not illustrated) that is a backlight for emitting illumination light onto the image display element, and a drive control unit (not illustrated) that controls operations.

The projection lens 30 (the projection lens 30A) is a projection optical system including, as structural components, a plurality of optical elements (lenses) (three lenses L1 to L3 in the example in FIG. 8 described below, for example) that are arranged along an incident side optical axis, for example. These optical elements are housed and supported by the lens tube BR, as described above. Note that the optical elements can form an intermediate image corresponding to the display image inside the light-guiding device 20 in cooperation with the light-guiding device 20, by configuring an aspherical lens including both an axially non-symmetric aspherical surface (non-axisymmetric aspherical surface) and an axially symmetric aspherical surface (axisymmetric aspherical surface). The projection lens 30 projects the video image light formed by the image display device 10 toward the light-guiding device 20 and causes it to be incident on the light-guiding device 20.

The light-guiding device 20 (the light-guiding device 20A) is a light guiding member or a light-guiding optical system that guides the video image light from the projection lens 30 to in front of the eyes of the observer by emitting, while also internally reflecting, the video image light.

The lens barrel BR (the lens cylinder BRa) is a cylindrical member that houses the optical elements (the lenses) that configure the projection lens 30. The image display device 10 is assembled to the light incident side of the projection lens 30, and the light-guiding device 20 is assembled to the light emission side of the projection lens 30. As a result, the components configuring the first display device 100A are integrated by the lens barrel BR (the lens barrel BRa).

Further, here, the normal direction of a light emitting surface 11a, which is an image surface of the image display device 10, is referred to as a z direction, and the z direction is aligned with an optical axis direction in which the optical axis of the projection lens 30 extends. In addition, in the in-plane direction of the light emitting surface 11a perpendicular to the z direction, one direction of the rectangular light emitting surface 11a or the image display device 10 is an x direction, and a direction perpendicular to the x direction is a y direction. Note that, here, the longitudinal direction of the rectangle is the x direction. Furthermore, in this case, the Y direction and the y direction, which are the vertical direction, are the same direction.

Further, as described and illustrated above, the first display device 100A is attached to the first subframe 103A in an upper portion (+Y side) of the lens barrel BRa. In this way, the first display device 100A is capable of rotating and moving in a plane perpendicular to the Y direction or the y direction along with the first subframe 103A with respect to the main frame 102, while maintaining overall optical positional relationships.

Further, the above also holds true for the second display device 100B. In other words, the second display device 100B is rotated by the second posture adjustment mechanism 105B with reference to the main frame 102 that is fixed with respect to the observer when the head-mounted display device 100 is worn.

In other words, with reference to the main frame 102 fixed with respect to the observer when the head-mounted display device 100 is worn, the first and second posture adjustment mechanisms 105A and 105B rotationally move the first and second display devices 100A and 100B, where an axial direction is the normal direction (the Y direction or the y-direction) of the horizontal plane (an XZ surface or an xz surface) that includes the horizontal direction (the X direction) in which the eyes of the observer are aligned side by side at a time of observation. Specifically, in the above-described case, the main frame 102 is fixed with respect to the observer, in particular, with respect to the position of the eye of the observer, and the first and second posture adjustment mechanisms 105A and 105B adjust the posture of the first and second display devices 100A and 100B with respect to the fixed main frame 102. As a result, a range of the incident angle of the image light is adjusted with respect to the eye of the observer. Additionally, at this time, in the posture adjustment of the first and second display devices 100A and 100B as described above, the first and second posture adjustment mechanisms 105A and 105B change the angle while maintaining the passage of the principal ray PR through the center point, which is the center position of the eyebox of each of the display devices 100A and 100B.

Hereinafter, with reference to FIG. 4 and the like, an example of the configuration of the posture adjustment mechanism, that is, the configuration of the posture adjustment mechanisms 105A and 105B, for performing the rotation operation described above will be described.

First, as described above, the first subframe 103A attached to the first display device 100A illustrated in FIG. 1 and the like, and the second subframe 103B attached to the second display device 100B illustrated in FIG. 1 and the like, are each separately rotatable by the first and second posture adjustment mechanisms 105A and 105B. For example, as exemplified in FIG. 4, an upper row α illustrates a state in which the first subframe 103A (equivalent to the first display device 100A), and the second display device 100B (equivalent to the second display device 100B) are emitting the image light to form the video image centered on a front direction for the observer, that is, a standard front direction. In contrast, a lower row β illustrates a state in which the display region of the first video image is changed by rotating only the first subframe 103A and changing an emission angle of the image light emitted from the first display device 100A.

Figure 4:
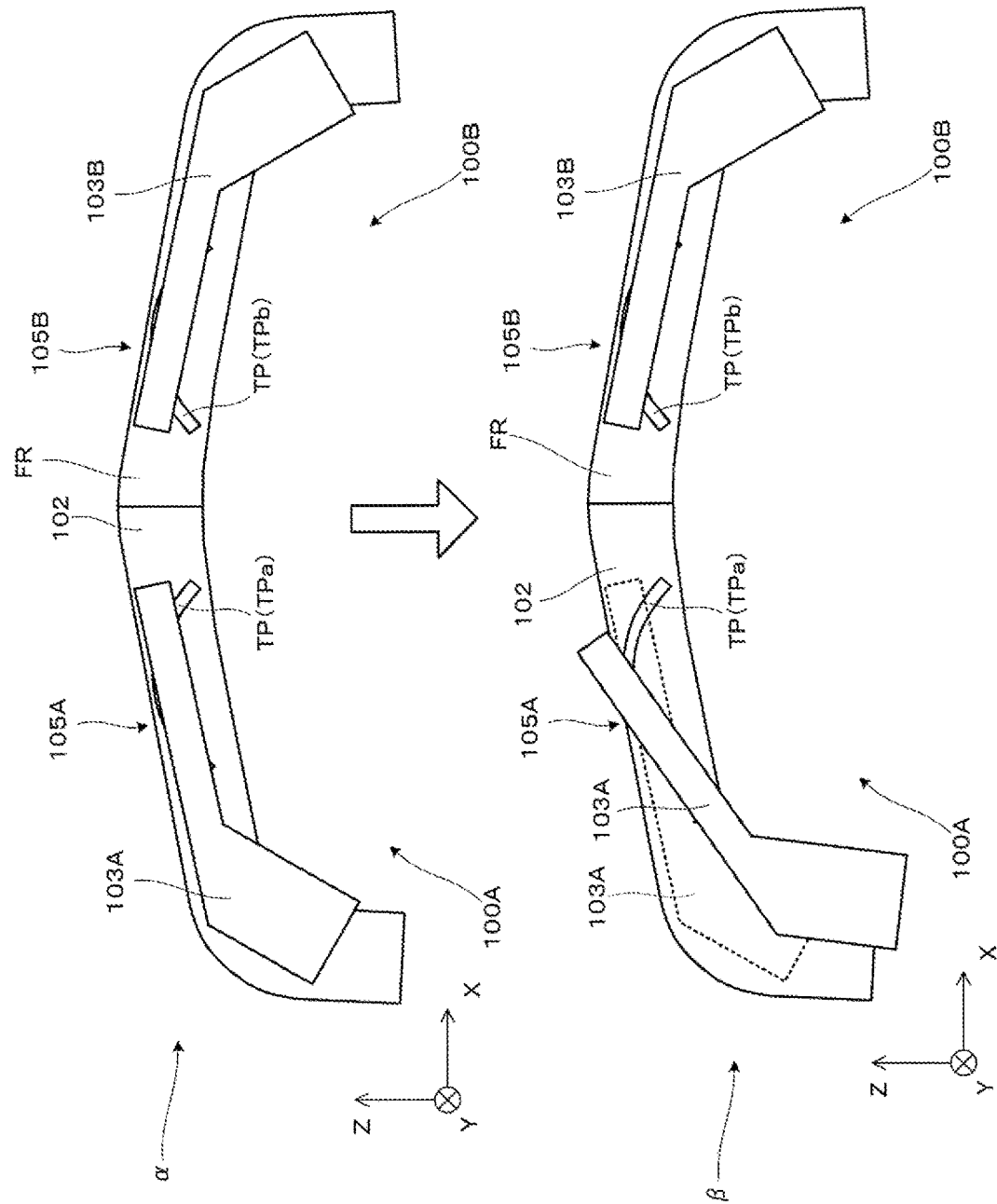
FIG. 4 is a conceptual diagram for describing an operation of the first display device.
Figure 5:
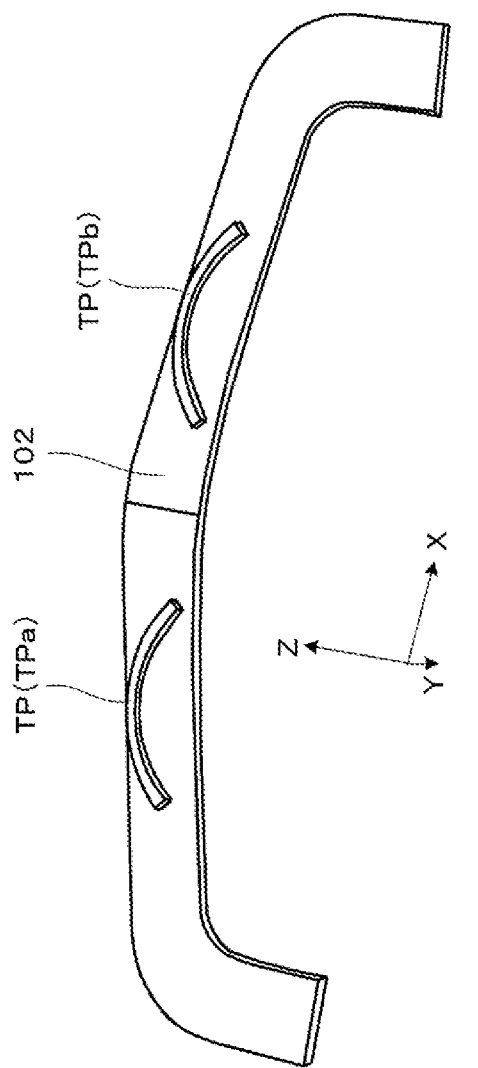
FIG. 5 is a conceptual diagram for describing a main frame configuring a posture adjustment mechanism.
Figure 6:
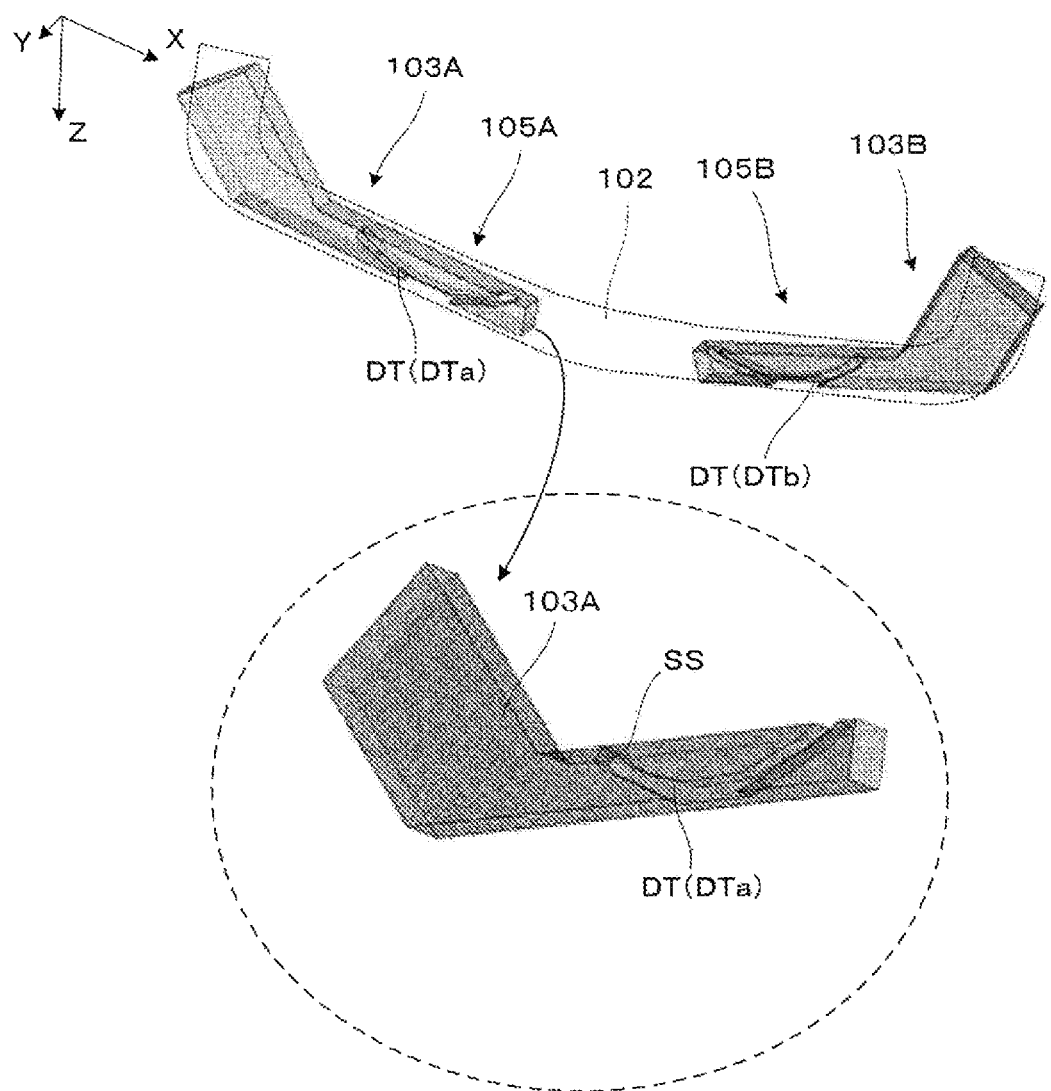
FIG. 6 is a conceptual diagram for describing a subframe configuring the posture adjustment mechanism.

As illustrated in FIG. 5, protruding portions TP are provided on the main frame 102 to form the first and second posture adjustment mechanisms 105A and 105B described above. Here, a pair of arc-shaped protruding portions TPa and TPb are provided as the protruding portions TP. On the other hand, as illustrated in FIG. 6, the first and second subframes 103A and 103B are provided with grooves DT corresponding to the protruding portions TP illustrated in FIG. 5. Here, a pair of groove portions DTa and DTb having a shape corresponding to the protruding portions TPa and TPb illustrated in FIG. 5 are provided as the grooves DT. In other words, the first posture adjustment mechanism 105A is configured by fitting together the protruding portion TPa and the groove DTa, and the second posture adjustment mechanism 105B is configured by fitting together the protruding portion TPb and the groove DTb. Further, in FIG. 6, as illustrated by enlarging the first subframe 103A, a stopper face SS is provided at one end of the arc-shaped groove portion DTa, for example, and a movement range of the first subframe 103A is regulated. Note that although a description and the like thereof are omitted, the second subframe 103B also has a similar configuration. By having the stopper face SS, in FIG. 4, for example, the first subframe 103A is able to change the posture from the state illustrated in the row α to the state illustrated in the row β, that is, can move the position of the image further to the outside (−X side), but is not able to move the image to the opposite, that is, the inner side (+X side). Similarly, the second subframe 103B is configured to be able to move the position of the image further to the outside (+X side), but not be able to move the image to the opposite, that is, the inner side (−X side).

Hereinafter, changes in the visual perception on the observer side due to rotation operations such as those described above will be described with reference to FIG. 7 and the like.

Figure 7:
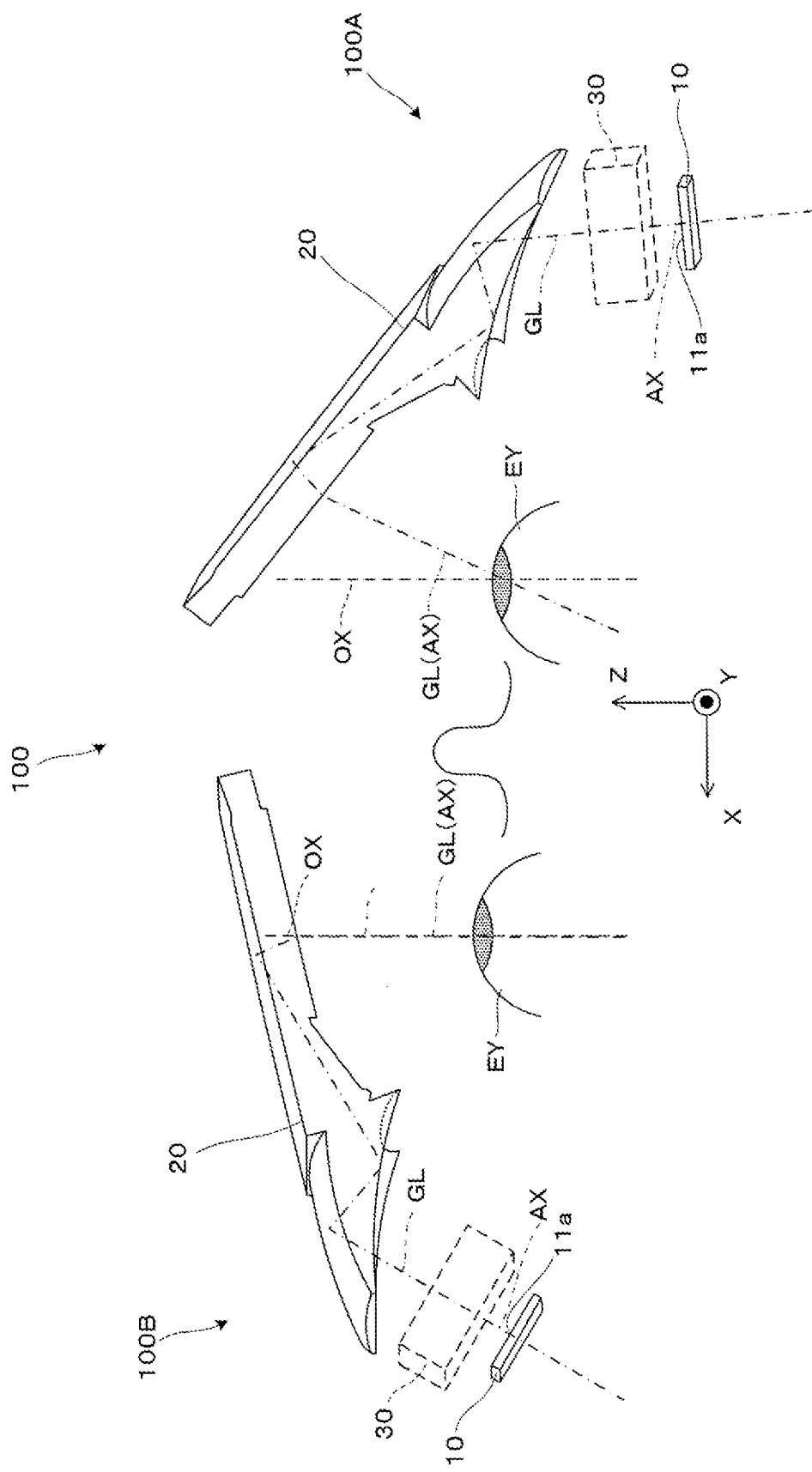
FIG. 7 is a conceptual diagram for describing the emission of image light to an observer by the first and a second display devices.
Figure 8:
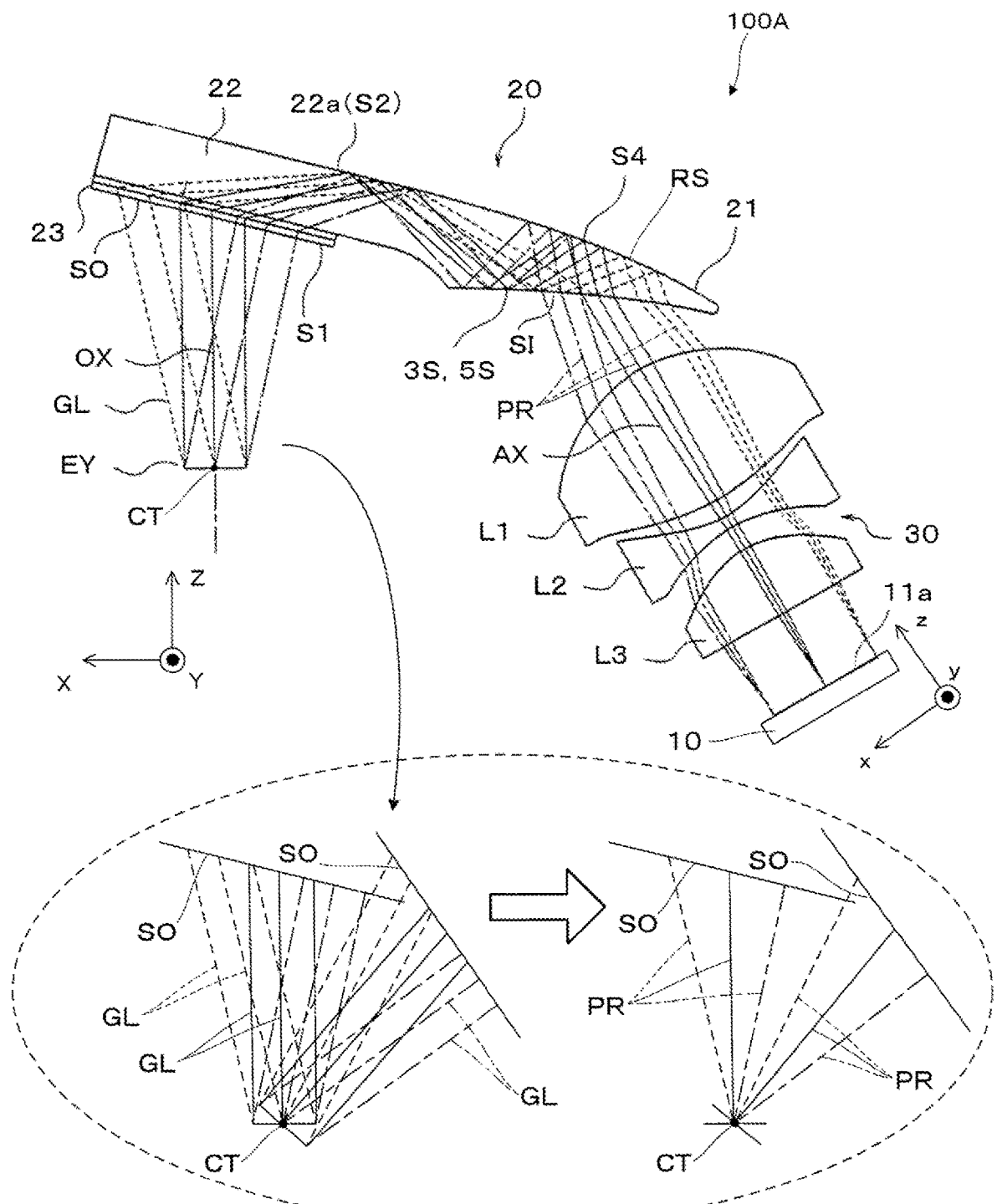
FIG. 8 is a conceptual diagram for describing changes in an emission angle of the image light to the observer by the first display device.

FIG. 7 is a conceptual diagram for describing the emission of image light GL to the observer by the first and second display devices 100A and 100B, and FIG. 8 is a conceptual diagram for describing changes in the emission angle of the image light GL to the observer by the first display device 100A.

In the example in FIG. 7, the image formation centered on the Z direction, that is, the front direction for the observer, is maintained for the second display device 100B, while the first display device 100A is in a rotated state. In this case, an optical axis AX that is an emission axis for emitting the image light GL in the second display device 100B is in a state of being aligned with the optical axis OX having as its reference the eye EY of the observer. On the other hand, the optical axis AX that is the emission axis in the first display device 100A is in a state of being inclined to the outside (−X side) with respect to the optical axis OX. In this case, the second video image from the second display device 100B is recognized by the observer as a left-right symmetric image centered on the front direction, while the first video image from the first display device 100A is recognized as an image that is displaced to the outside, that is, to the right side.

Hereinafter, the optical path of the image light GL in the first display device 100A will be described with reference to FIG. 8, and the principle for making the visual perception as described above will be described.

First, the configuration of each component of the first display device 100A will be described as a prerequisite to the description of the optical path of the image light GL. As illustrated, in the example here, of the first display device 100A, the projection lens 30 is configured by the three lenses L1 to L3. Further, the light-guiding optical system 20 includes an incidence part 21 that captures the image light GL, a parallel light guide body 22 for guiding the light, and an emitting part 23 for emitting the image light.

The incidence part 21 is arranged at the ear side of the observer, and the emitting part 23 is arranged at the nose side of the observer. The main bodies of the parallel light guide 22 and the incidence part 21 are molded into an integrated part or a single member by a resin material having high light transmissivity.

The incidence part 21 has a light incidence surface SI configured to capture the image light GL from the projection lens 30, and a reflection surface RS that reflects the captured image light GL and guides the image light GL into the interior of the parallel light guide body 22. The light incidence surface SI is formed by a convex curved surface on the projection lens 30 side, and also has a function of totally reflecting, on the inner surface side, the image light GL reflected by the reflection surface RS. The reflection surface RS is formed by a convex curved surface on the projection lens 30 side. The reflection surface RS is formed by performing film formation, such as aluminum evaporation, on the curved surface, reflects the image light GL entering from the light incidence surface SI, and bends the light path in a predetermined direction. The inner side of the light incidence surface SI totally reflects the image light GL reflected by the reflection surface RS, and bends the light path in a predetermined direction. Note that the curved surface forming each surface is a non-axisymmetric free curved surface, but is not limited thereto, and can be an axisymmetric free surface, a spherical surface, a non-spherical surface, or the like. Further, each of the curved surfaces can assist a collimation function by the projection lens 30.

The parallel light guide body 22 is a flat plate portion, and has two planes 22a and 22b facing each other that form a pair of surfaces extending in parallel. Since both of the planes 22a and 22b are parallel planes, the external image is not magnified and a focus is not shifted. In the parallel light guide body 22, the one plane 22a functions as a total reflection surface that totally reflects the image light from the incidence part 21, and has a role of guiding the image light to the emitting part 23, with a minimum loss. The plane 22b on the back side forms a boundary surface between the parallel light guide body 22 and the emitting part 23.

The emitting part 23 is a member that is formed in layers on an extension along the plane 22b at the back side, on a far side of the parallel light guide body 22, that is, on the nose side of the observer, and includes a reflection unit formed by arranging a plurality of mirrors having light transmissivity. As a result, while allowing the passage of the image light GL that is totally reflected at the plane 22a on the outside forming the total reflection surface of the parallel light guide body 22, the emitting part 23 reflects the incident image light GL at a predetermined angle and bends the incident image light GL to the light emitting surface SO side.

Note that each optical surface of the light-guiding optical system 20 on the light path is set sequentially from the downstream of the light path, as described below. First of all, the plane 22b of the parallel light guide body 22 or the light emitting surface SO is set as a first surface S1, and the plane 22a is set as a second surface S2. Next, the light incidence surface SI of the incidence part 21 is set as a third surface S3 when considered to be a reflection surface through total reflection. In addition, the reflection surface RS of the incidence part 21 is set as a fourth surface S4. Finally, the light incidence surface SI is set as a fifth surface S5 when considered to be a surface that captures light.

Next, an operation of the image formation in the first display device 100A illustrated in FIG. 8 along the light path of the image light GL will be described briefly.

First, the image light GL emitted from the light emitting surface 11a of the image display device 10 is emitted toward the light-guiding device 20 after passing through the projection lens 30 configured by the three lenses L1 to L3. The image light GL is incident from the fifth surface S5 of the light-guiding device 20, is reflected by the fourth surface S4, is further totally reflected on each of the third surface S3 and the second surface S2, and reaches the first surface S1. Then, the image light GL is emitted toward the eyes EY of the observer while being bent. Specifically, the image light GL reaches the eyes EY of the observer by being guided by the light-guiding device 20. When reaching the position of the eyes EY, each component of the image light GL is a parallelized bundle of rays, and is incident while being superimposed at the position of the eyes EY. The observer identifies the image position by means of the incident direction or incident angle of light, and visually recognizes the virtual image. In this case, the cross-sectional shape of each of the bundle of rays superimposed at the position of the eyes EY becomes the eye ring shape, and a diameter thereof becomes an eye ring diameter. In the present embodiment, the location of this eye ring shape is also referred to as the eyebox.

As a result of the type of configuration described above, the image light GL from the image display device 10 is reliably guided to in front of the eyes of the observer.

Note that in the case of the above-described configuration, by providing a free curved surface on some of the first surface S1 to the fifth surface S5, a load on the projection lens 30 can be reduced, and as a result the optical system can be made thinner. Further, during the optical design, by following the light path in an order that is the reverse of the above, that is, in an order starting from the first surface S1 with the position of the eyes EY as the first reference, the settings of each part are made.

Here, in the case of the virtual image in the above-described type of mode, when the visual perception is changed, by changing the emission angle of the image light GL such that the eyebox (the eye ring shape) does not go outside a range assumed as the position of the eyes of the observer at the time of being worn, the image position at which the virtual image is visually recognized can be changed. Here, in the present embodiment, as a result of the first display device 100A being rotatingly movable taking, as a center of rotation, a center point CT of the position of the eyes EY, that is, the eye ring shape (or the eyebox), which is a point through which a principal ray of the image light GL from each of points of the light emitting surface 11a passes, and is a point that is an ideal center of the pupil of the observer, the position change of the first video image formed by the first display device 100A is possible. In the drawings, as illustrated by partial enlargement, by rotating the first display device 100A, the orientation of the light emitting surface SO changes, but at that time, as illustrated by the right side in the partially enlarged diagram, the posture of the first display device 100A is adjusted such that, with respect to a principal ray PR of the image light GL of the first video image that is the target of the display position change, the angle is changed while maintaining its passage through the center point CT that is the center position of the eyebox. The rotation operation as described above is realized by the first posture adjustment mechanism 105A illustrated in FIG. 3 and the like.

Figure 9:
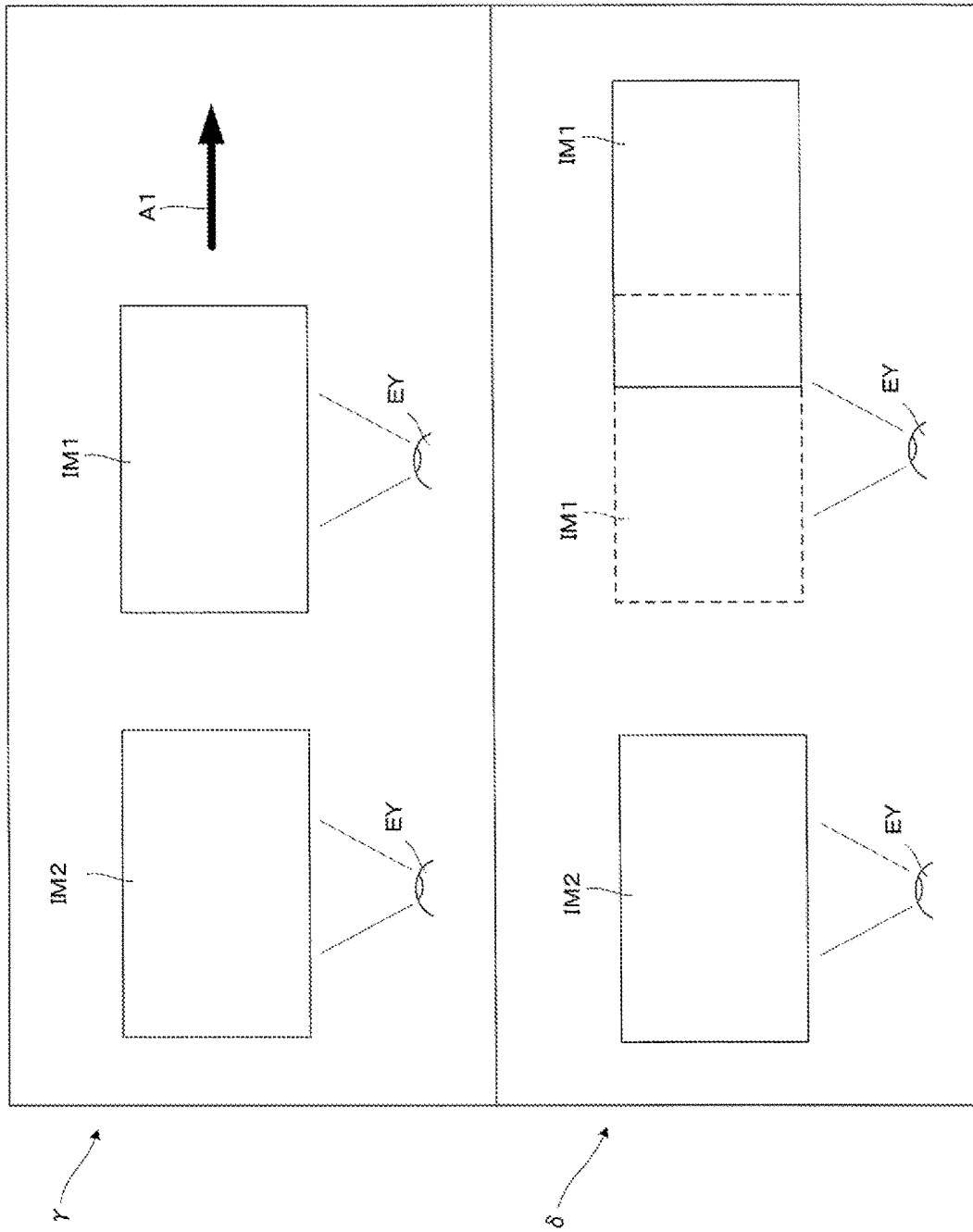
FIG. 9 is a conceptual diagram of an entire video region recognized by stereoscopic vision.

As described above, for example, as illustrated in an upper row γ in FIG. 9, of the first video image IM1 and the second video image IM2 formed by the first and second display devices 100A and 100B, respectively, the first video image IM1 formed by the first display device 100A can be moved in a direction indicated by an arrow A1 to allow the first video image IM1 to be visually recognized as an image displaced to the outside, that is to the right side, as illustrated in a lower row δ in FIG. 9. Note that in this case, as described above, the second video image IM2 formed by the second display device 100B can be caused to be recognized as being directly in front, and the first video image IM1 formed by the first display device 100A can be caused to be recognized as being in a position displaced from the front to the right side. In this case, even if the display contents are mutually different for the right and left eyes, the images can be recognized in each of the right eye and the left eye, the images can be individually recognized without any fusion between them, and an amount of information can be increased.

In addition, in this case, by manually or automatically rotatingly moving the first display device 100A and the second display device 100B individually, the image required by the observer can be sifted and selected. For example, by rotating the video image for which the display position is to be changed by an angle that is equal to or greater than half the angle of view of the video image, both the images (both video images) can be sufficiently separated, and the images can be prevented from being recognized in a superimposed position. For example, in a case in which the angle of view (FOV) of the video image is 50°, by setting a range over which the display position can be changed to be 25° or greater, the left and right images can be sufficiently separated even when the angle of view is wide.

Hereinafter, control of the head-mounted display device 100 according to the present embodiment will be described with reference to a block diagram in FIG. 11. In particular, here, among the various control operations, control relating to the video display operation will be mainly described.

Figure 11:
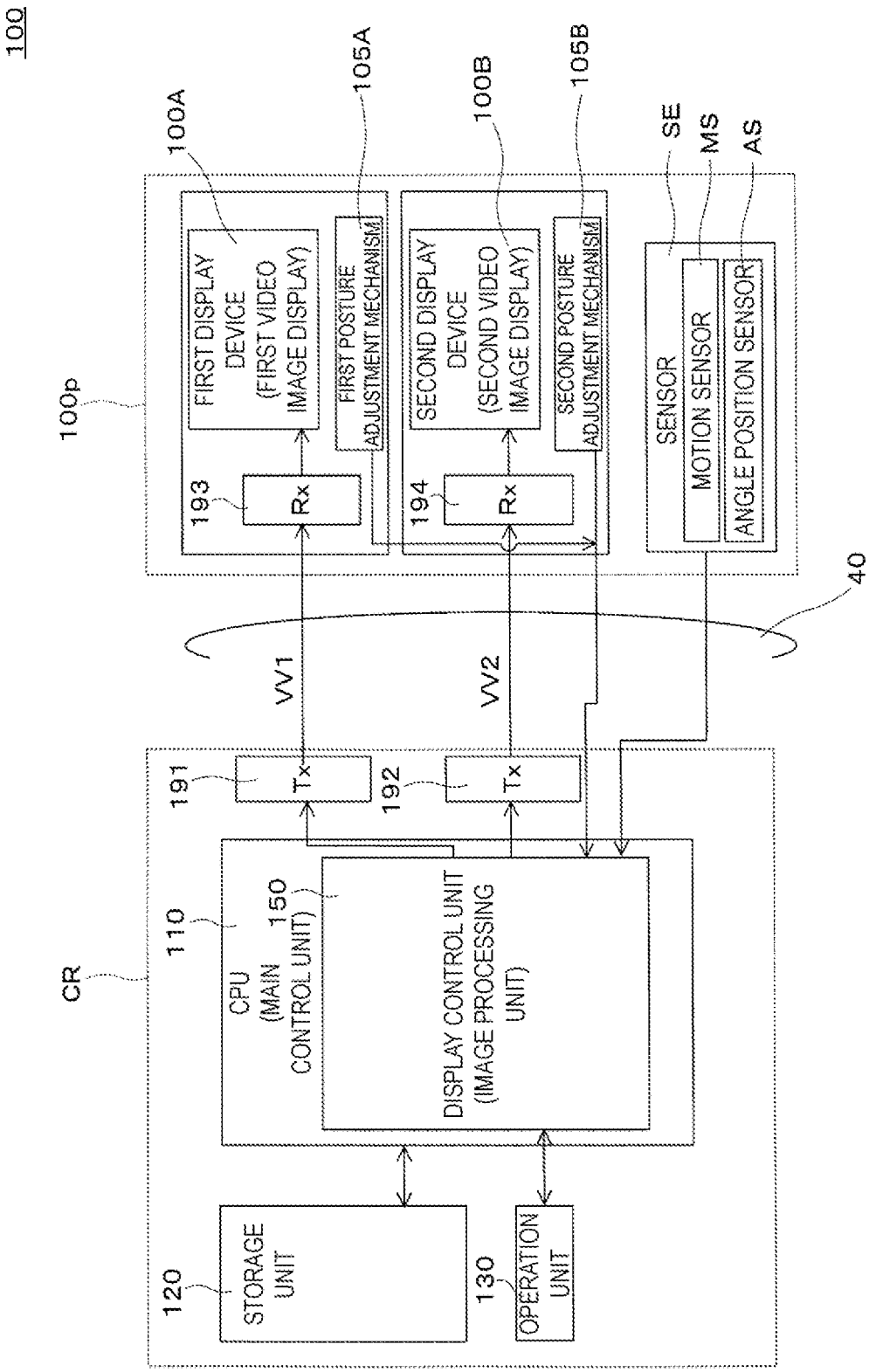
FIG. 11 is a block diagram for describing control of the head-mounted display device.

FIG. 11 is a block diagram illustrating an example of a configuration for describing the control of the head-mounted display device 100 illustrated in FIG. 1 and the like. As illustrated in the drawings, here, in addition to the optical systems and eyeglass-shaped frames configuring the mounting side illustrated in FIG. 1 and the like, the head-mounted display device 100 is provided with various sensors and the like (not illustrated), and, further, with a control device CR configuring a controller or the like as a UI for performing various control operations, such as the image display operation. Thus, in FIG. 11, of the head-mounted display device 100, respective portions on the mounting side illustrated in FIG. 1 and the like are referred to as a main body 100p, and respective portions on a control side, such as the controller, are illustrated as the control device CR.

As illustrated here, various signals (in particular, video signals) are transmitted from the control device CR side to the main body 100p. Further, in addition to each of the above-described components, various types of sensor SE and the like are provided inside devices of the main body 100p. It is conceivable that the various sensors SE include, for example, a motion sensor MS that is configured by a gyro sensor or the like, and that detects acceleration and the like, thus allowing the posture, the movement, and the like of the observer to be ascertained, and an angle position sensor AS or the like that detects a rotation angle of the first and second posture adjustment mechanisms 105A and 105B. Various signals for the various types of information acquired from these sensors are transmitted to the control device CR from the main body 100p side.

Hereinafter, the configuration of the control device CR will be described in detail. First, of the head-mounted display device 100, the control device CR includes a CPU (main control unit) 110, a storage unit 120, an operation unit 130, and transmission units (Tx) 191 and 192.

The storage unit 120 is configured by a ROM, a RAM, and the like, and various computer programs and types of data are stored in the storage unit 120.

By reading and executing a computer program or data from the storage unit 120, the CPU 110 functions as a display control unit (image processing unit) 150 configured by an operating system (OS) or the like, or as an input signal processing unit or the like. In other words, the CPU 110 functions as a main control unit responsible for the entire control of the head-mounted display device 100 by performing a variety of computational processing.

The operation unit 130 is an external input receiving device (input device) that is operated by the observer or the user, is configured by a determination key, a display switching key, a track pad, a brightness switching key, a direction key, a menu key, and the like, and acquires a signal corresponding to an operation input by the observer or the user.

The transmission units 191 and 192 respectively transmit various data, including video signals generated by the CPU 110, to the first and second display devices 100A and 100B configuring the main body 100p. In other words, the transmission units 191 and 192 function as transceivers for serial transfer between the control device CR and the first and second display devices 100A and 100B.

Note that, in addition to the above, it is also conceivable to provide, on the main body 100p, a line-of-sight sensor or the like for detecting the line of sight of the observer, for example, or to provide various communication devices and interfaces for communicating with the outside, and further to provide various equipment for outputting sound, and the like.

The processing on the main body 100p side of the head-mounted display device 100 will be described below. First, reception units 193 and 194 function as receivers for the serial transfer between the control device CR and the first and second display devices 100A and 100B, and the first and second display devices 100A and 100B perform image formation on the basis of right eye image data and left eye image data respectively received by the reception units (Rx) 193 and 194.

In the configuration as described above, in a case in which the CPU 110 functions as the display control unit (or the image processing unit) 150, the display control unit 150 generates image data (right eye image data and left eye image data) on the basis of the image signal included in the content or the like for each video image. The generated signals are supplied to the first and second display devices 100A and 100B that configure the main body 100p, as video signals for controlling the display operation of the head-mounted display device 100. In other words, the CPU 110 controls the image display by transmitting the generated video signals to the reception units 193 and 194 via the transmission units 191 and 192, respectively.

Here, as the video signals (image data) to be transmitted, the display control unit 150 generates image information VV1 relating to the first video image IM1 for the first display device 100A and image information VV2 relating to the second video image IM2 for the second display device 100B. In other words, the display control unit 150 transmits data information of different contents, through the image display allowing visual recognition by the right eye and the image display allowing visual recognition by the left eye. Furthermore, in this case, the display control unit 150 forms the image information VV1 and VV2 while taking into account information relating to the posture adjustment (or a state) of the first and second display devices 100A and 100B on the basis of a state of the first and second posture adjustment mechanisms 105A and 105B, which is the rotation angle of the first and second posture adjustment mechanisms 105A and 105B, using the motion sensor MS and the angle position sensor AS provided as the sensors SE.

Further, in this case, for example, the content to be displayed may be changed in accordance with a mode to be used for the video image. Specifically, a control mode may be changed according to a display content change mode for changing the display content in conjunction with the display position change of the video image, and to a display content maintaining mode for maintaining the display content regardless of the display position change. In this case, in the display content change mode, it is conceivable that the display content is changed so as to maintain an arrangement relationship of the display content in a virtual image display space. For example, a mode is conceivable in which, for a part of a large building that is projected as the image, the display content is changed such that a visible location changes in accordance with the rotational movement of the first and second display devices 100A and 100B.

Figure 12:
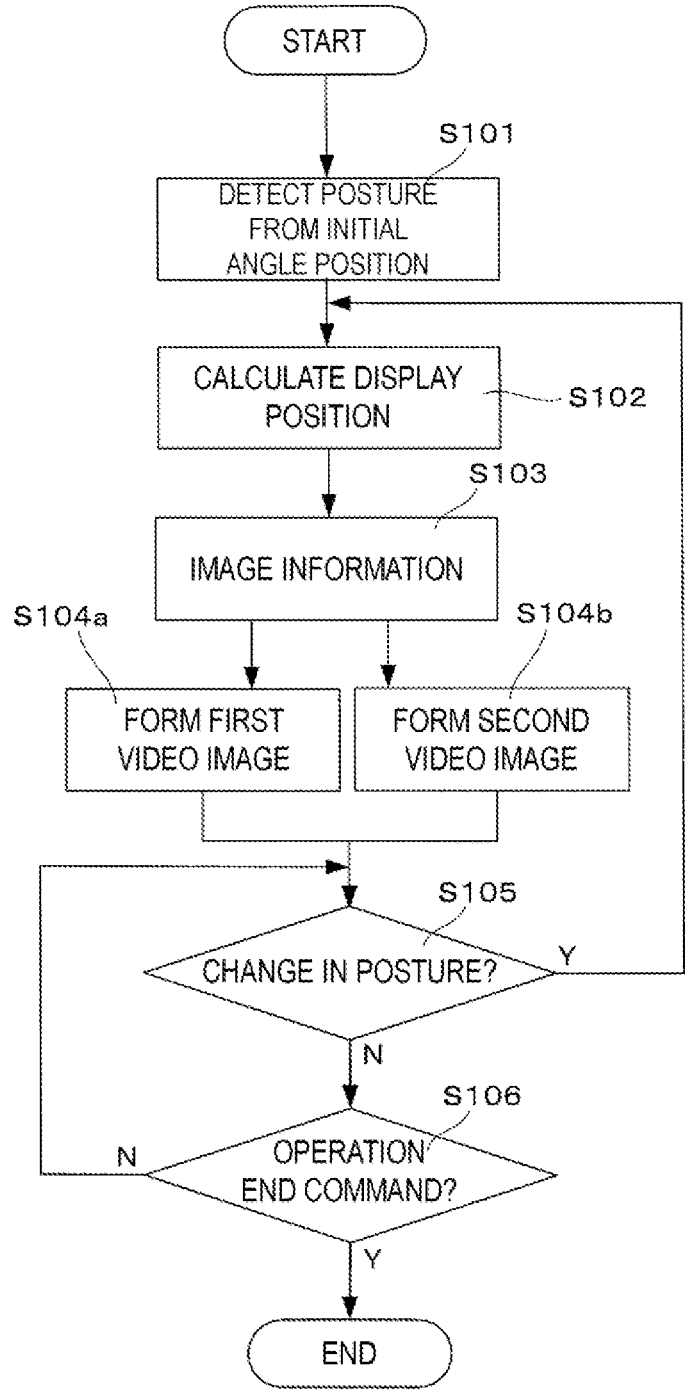
FIG. 12 is a flowchart for describing an example of display control.

An example of the display control of the head-mounted display device 100 will be described below with reference to a flowchart in FIG. 12. In particular, an example of operations relating to display position changes will be described.

First, when the main body 100p is activated by communication from the control device CR, the display control unit 150 checks the posture of the first and second display devices 100A and 100B in an initial state, from the detection results of the angle position sensor AS and the like (step S101). Next, the display control unit 150 calculates the display positions of the first video image IM1 and the second video image IM2 on the basis of the detection result at step S101 (step S102), and generates image information to be output on the basis of the calculation result (step S103). Note that at step S103, the display control unit 150 generates and transmits the image information VV1 for the right eye, that is for the first display device 100A and the image information VV2 for the left eye, that is for the second display device 100B. When the image information VV1 and VV2 generated in the display control unit 150 are transmitted, a drive circuit of an image display device 10A operates accordingly in the first display device 100A, and the image formation of the first video image IM1 is performed (step S104a). Similarly, in the second display device 100B, a drive circuit of an image display device 10B operates and the image formation of the second video image IM2 is performed (step S104b). As described above, when the display operation by the first and second display devices 100A and 100B is started, the display control unit 150 of the control device CR again confirms the posture of the first and second display devices 100A and 100B from the detection results of the angle position sensor AS and the like (step S105). In other words, the display control unit 150 checks the presence or absence of a change in the posture of the first and second display devices 100A and 100B. At step S105, in a case in which the change in posture is confirmed (step S105: Yes), the display control unit 150 again performs the operation from step S102 and transmits the newly generated image information VV1 and VV2. On the other hand, at step S105, when no change in the posture is confirmed (step S105: No), the display control unit 150 checks the presence or absence of an end command to end the display operation (step S106). When, at step S106, there is no end command to end the display operation (step S106: No), the checking of the posture of the first and second display devices 100A and 100B is continued, and when, at step S106, there is the end command to end the display operation (step S106: Yes), the series of operations is ended.

As described above, in the head-mounted display device 100 of the present embodiment, in the right and left pair of the first display device 100A and the second display device 100B that configure the display mechanism DA, the first video image IM1 and the second video image IM2 having the mutually different display content can be visually recognized. Further, the first and second posture adjustment mechanisms 105A and 105B that are the posture adjustment mechanism allow the display position of the first video image IM1 and the second video image IM2 to be changed. As a result, an optical performance and miniaturization can be maintained while increasing a displayed information amount by separately displaying various information, in comparison to a case in which an image of a single size is visually recognized by both eyes, for example.

Second Embodiment

Below, an example of a head-mounted display device according to a second embodiment will be described with reference to FIG. 13 and the like.

The head-mounted display device according to the present embodiment is a modified example of the head-mounted display device exemplified in the first embodiment, and is similar to the case described in the first embodiment apart from a rotatable range of the first and second display devices 100A and 100B, and thus, a description relating to the whole of the head-mounted display device is omitted.

Figure 10:
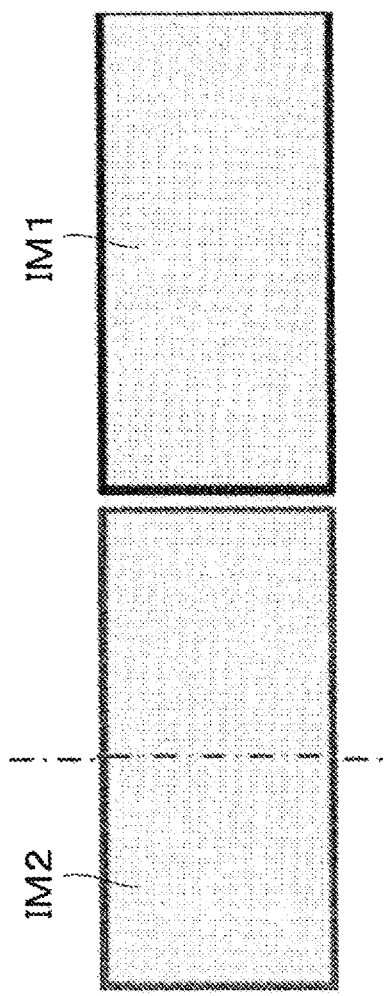
FIG. 10 is a conceptual diagram of the entire video region recognized by stereoscopic vision.
Figure 13:
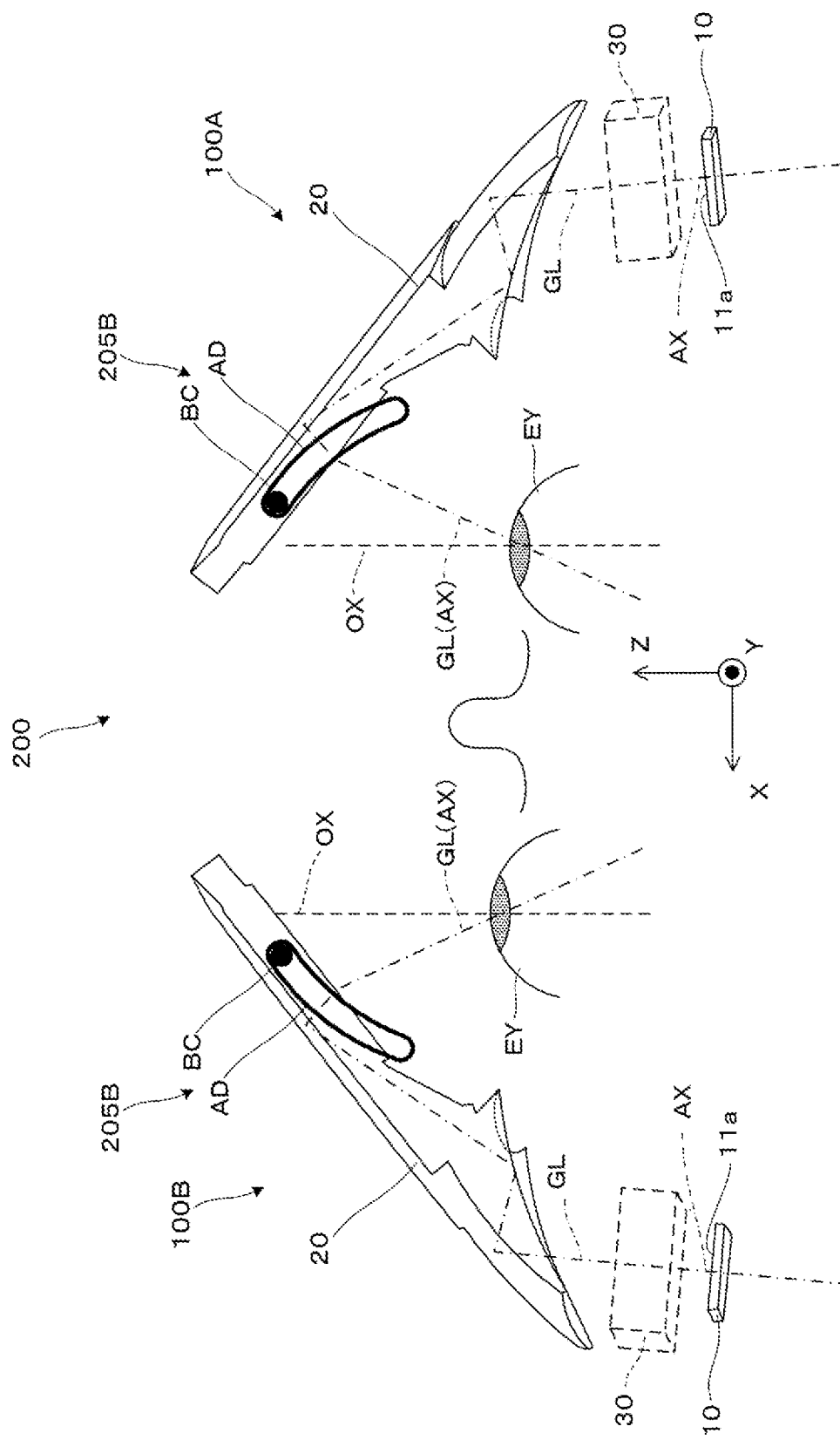
FIG. 13 is a conceptual diagram for describing the emission of the image light to the observer by a head-mounted display device according to a second embodiment.
Figure 14:
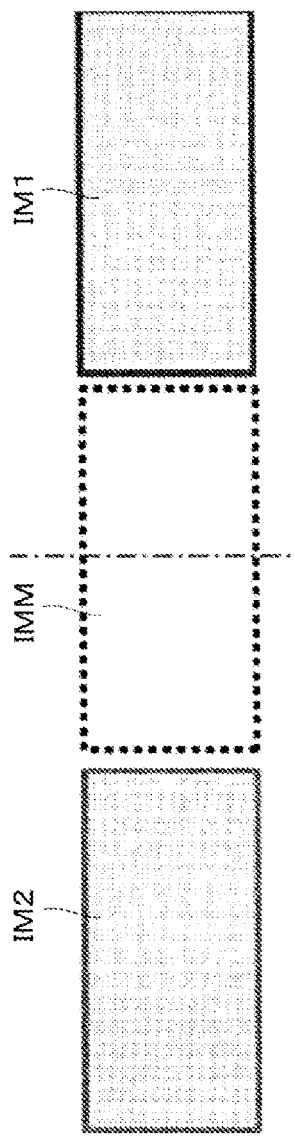
FIG. 14 is a conceptual diagram of an entire video region recognized by stereoscopic vision.

FIG. 13 is a conceptual diagram for describing a configuration example of a head-mounted display device 200 according to the present embodiment, is a diagram corresponding to FIG. 7, and is for describing the emission of the image light GL to the observer by the head-mounted display device 200 according to the present embodiment. Further, FIG. 14 is a diagram corresponding to FIG. 10, and is a conceptual diagram of the entire video region recognized by stereoscopic vision.

In FIG. 13, arc-shaped regions AD and black circles BC illustrate first and second posture adjustment mechanisms 205A and 205B of the head-mounted display device 200 in an abstract manner. More specifically, the arc-shaped regions AD illustrate a range over which movement in the first and second posture adjustment mechanisms 205A and 205B is allowed, and the black circles BC illustrate a range of movement of the first and second display devices 100A and 100B in the arc-shaped regions AD. In the case of the illustration, the first display device 100A can move an emission position of the image light GL further to the outside (−X side), but cannot move the image light GL to the opposite side, that is, to the inner side (+X side). Similarly, the second display device 100B can move the emission position of the image light GL further to the outside (+X side), but cannot move the image light GL to the opposite side, that is, to the inner side (−X side). In this case, as illustrated in FIG. 14, this is a mode in which the first image IM1 formed by the first display device 100A is recognized in a position displaced to the right side from the front position, the second image IM2 formed by the second display device 100B is recognized in a position displaced to the left side from the front position, and the image display is not performed at all in an image range IMM in the front position illustrated by dotted lines. Specifically, the display position of the first video image IM1 and the display position of the second video image IM2 are maintained in a state of being separated, and in particular, both the first display device 100A and the second display device 100B display the first video image IM1 and the second video image IM2, in a display position other than the front position. In this case, even if a situation arises in which, even though there are circumstances in which the observer wishes to view the external world, such as in an emergency, each of the display devices 100A and 100B remain completely illuminated due to a malfunction, for example, it is possible to secure the external world view at the front position. Various determinations can be made for the range of the external world in the emergency or the like, and various settings are conceivable in accordance with operations performed while using the head-mounted display device 100. For example, when performing an operation concentrating on a single point, it is conceivable to make settings such that only a directly front range of a relatively narrow front view is secured. However, when watching a PC screen or reading a book, it is conceivable that it may be necessary to provide a non-display range to the front, to an extent that a visual field can be secured for a range over which the line of sight moves in these operations. Further, a range of an angle at which a human being can observe at a high resolution, such as approximately 5°, that is, a range of a few degrees may be set as the front position, and the display position may be set that is outside this range. Note that, in the above description also, similarly to the case of the first embodiment, in the positional adjustment, the first and second posture adjustment mechanisms 205A and 205B change the angle while maintaining the passage of the principal ray PR through the center point, which is the center position of the eyebox of the first and second display devices 100A and 100B. Specifically, as illustrated in a partially enlarged view in FIG. 8, the angle is changed while maintaining the passage of the principal ray PR through the center point CT. Note that, in the case of the present embodiment, in contrast to the first embodiment, the posture adjustment is made that involves the change of the display content or the like as described above, in the display position other than the front position.

As described above, in the head-mounted display apparatus 200 according to the present embodiment also, the mutually different display content can be visually recognized in the first and second display devices 100A and 100B as the first video image IM1 and the second video image IM2. Further, by causing the display positions of the first video image IM1 and the second video image IM2 to be changeable by the first and second posture adjustment mechanisms 205A and 205B, which are the positional adjustment mechanism, the optical performance and miniaturization can be maintained while increasing the displayed information amount by separately displaying various information, in comparison to the case in which the image of a single size is visually recognized by both eyes, for example. In particular, in the case of the present embodiment, a state in which the first video IM1 and the second video IM2 are displayed at a display position outside of the front position can be maintained.

Third Embodiment

Below, an example of a head-mounted display device according to a third embodiment will be described with reference to FIG. 15 and the like.

The head-mounted display device according to the present embodiment is a modified example of the head-mounted display device exemplified in the first embodiment, and is similar to the case described in the first embodiment apart from the posture adjustment mechanism, and thus, a description relating to the whole of the head-mounted display device is omitted.

Figure 15:
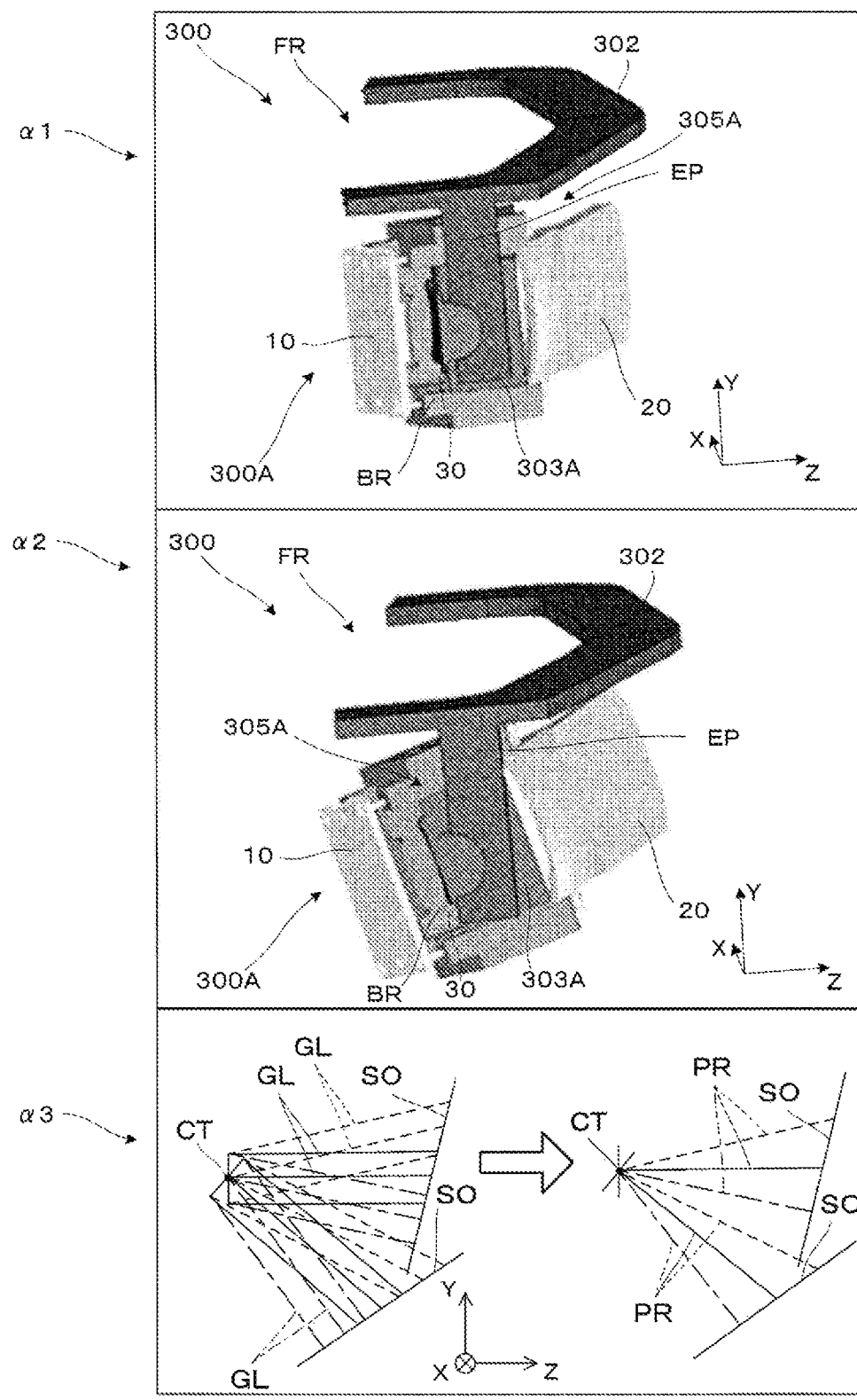
FIG. 15 is a conceptual perspective view illustrating a head-mounted display device according to a third embodiment.

FIG. 15 is a conceptual perspective view for describing a configuration example of a head-mounted display device 300 according to the present embodiment. Note that in FIG. 15 and the like, only a first display device 300A for the right eye attached to the frame portion FR is illustrated. A second display device for the left eye is the same as the first display device 300A, and thus the illustration thereof is omitted.

As is clear from a comparison between an upper row α1 and a middle row α2, in the head-mounted display device 300 illustrated in FIG. 15, a first posture adjustment mechanism 305A is configured as the posture adjustment mechanism that allows the display position of the video image to be changed not in the left-right direction in which the eyes of the observer are aligned side by side (the X direction), but to be changed in the vertical direction (the Y direction) that is perpendicular to the left-right direction. That is, the structures of a main frame 302 and a subframe 303A, which are the frame portions FR for configuring the first posture adjustment mechanism 305A, differ from the structures of the main frame 102 and the subframe 103A illustrated in FIG. 1 and the like. Further, in this case also, as illustrated in a light ray diagram in a lower row α3 corresponding to the partially enlarged view in FIG. 8, the first posture adjustment mechanism 305A adjusts the posture so as to change the angle of the first display device 300A while maintaining the passage of the principal ray PR through the center point CT.

Figure 16:
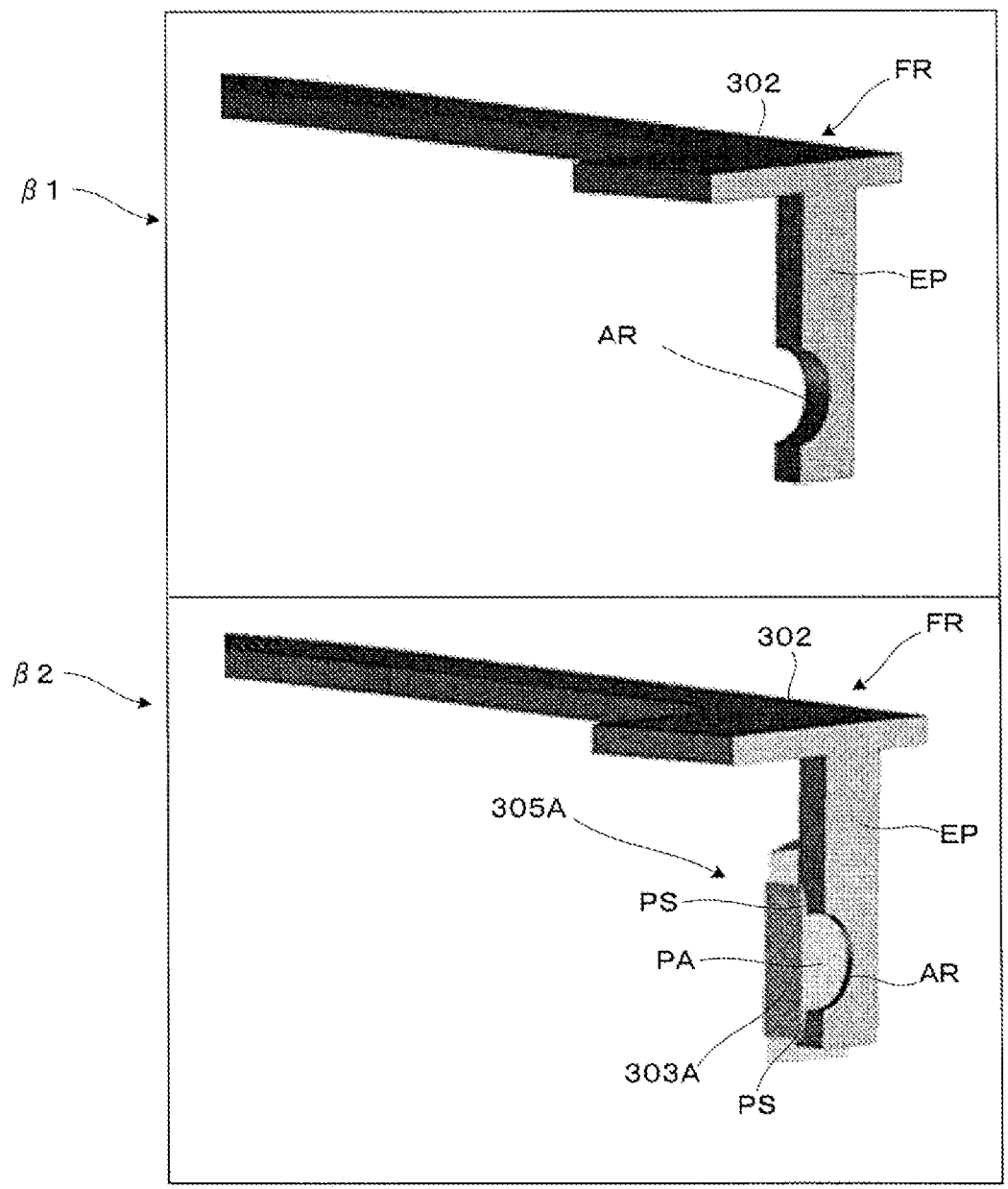
FIG. 16 is a perspective view for describing a main frame and a subframe configuring a posture adjustment mechanism.

FIG. 16 is a perspective view for describing the main frame 302 and the first subframe 303A. An upper row β1 illustrates the main frame 302, and a lower row β2 illustrates a state in which the first subframe 303A is attached to the main frame 302. As illustrated in the upper row β1, here, of the long thin main frame 302 that is bent into a U shape, an arc-shaped surface AR is provided that is recessed into an extending portion EP, which extends from a side surface of the bent leading end of the main frame 302 towards a lower side (−Y side). On the other hand, as illustrated in the lower row β2, a semicircular disc-shaped protruding portion PA is provided on the first subframe 303A so as to correspond to the arc-shaped surface AR of the extending portion EP. The protruding portion PA is rotatably engaged with the arc-shaped surface AR so as to function as the first posture adjustment mechanism 305A. In other words, the first subframe 303A is attached to the lens barrel BR of the first display device 300A configuring the head-mounted display device 300, and the first display device 300A is supported by the frame portion FR in a rotatable state. In the above-described manner, the first display device 300A as illustrated in FIG. 15 is capable of rotating and moving along the arc-shaped surface AR. Further, a stopper portion PS that comes into contact with the extending portion EP is provided on both ends of the protruding portion PA, and the range of movement of the first subframe 303A is regulated.

Note that although an illustration and description thereof have been omitted, the second display device for the left eye, the second subframe, and the like have a similar configuration. Specifically, in the case of the present embodiment, the posture adjustment can be performed separately and independently for the left and the right in the up-down direction (the Y direction).

Note that, in the above-described case, with reference to the main frame 302 fixed with respect to the observer when the head-mounted display device 300 is worn, the first posture adjustment mechanism 305A, and the second posture adjustment mechanism 305B (not illustrated), rotationally move the first display device 300A, and the second display device 300B (not illustrated), where the horizontal direction (the X direction) along the alignment of the eyes of the observer at a time of observation is an axial direction.

As described above, in the head-mounted display apparatus 300 according to the present embodiment also, the mutually different display content can be visually recognized in the first and second display devices as the first and second video images. Further, by causing the display positions of the first and second video images to be changeable by the first and second positional adjustment mechanisms, which are the positional adjustment mechanism, the optical performance and miniaturization can be maintained while increasing the displayed information amount by separately displaying various information, in comparison to the case in which the image of a single size is visually recognized by both eyes, for example. In particular, in the case of the present embodiment, the display modes of the first and second video images can be changed in the up-down direction.

Fourth Embodiment

Below, an example of a head-mounted display device according to a fourth embodiment will be described with reference to FIG. 17.

The head-mounted display device according to the present embodiment is a modified example of the head-mounted display device exemplified in the first embodiment, and is similar to the case described in the first embodiment apart from differences in a configuration of a display device and a method of the posture adjustment, and thus, a description relating to the whole of the head-mounted display device is omitted.

Figure 17:
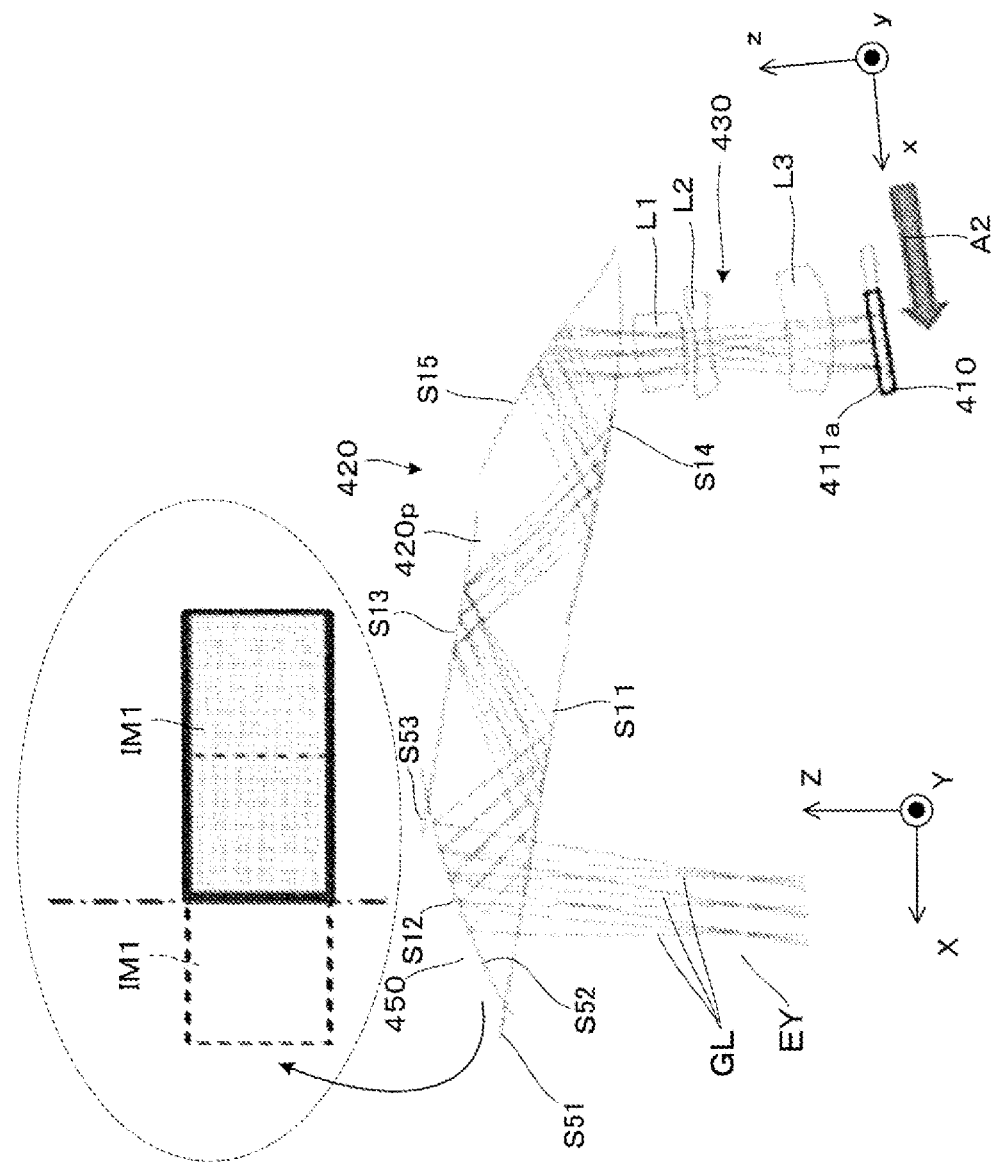
FIG. 17 is a conceptual plan view illustrating a head-mounted display device according to a fourth embodiment.

FIG. 17 is a conceptual plan view illustrating a configuration example of a head-mounted display device 400 according to the present embodiment. Note that in FIG. 17, only a first display device 400A for the right eye is illustrated. A second display device for the left eye is the same as the first display device 400A, and thus the illustration thereof is omitted.

As illustrated, similarly to the case of the first display device 100A according to the first embodiment illustrated in FIG. 8 and the like, in addition to an image display device 410, which is a display element that emits the image light GL from a light emitting surface 411a that is an image surface, the first display device 400A includes a projection lens 430 configured by the three lenses L1 to L3, and a light-guiding device 420.

Here, the light-guiding device 420 includes a light guiding member 420p for guiding light and for a see-through perspective, and a light transmitting member 450 for the see-through perspective.

The light guiding member 420p includes first to fifth sides S11 to S15 as side surfaces having an optical function. Of these surfaces, the first surface S11 and the fourth surface S14 are adjacent, and the third surface S13 and the fifth surface S15 are adjacent. Further, the second surface S12 is disposed between the first surface S11 and the third surface S13. A half mirror layer is attached to the surface of the second surface S12. The half mirror layer is a reflective film having light transmissivity, (a semi-transmissive reflective film) that is formed by depositing a metallic reflective film or a dielectric multilayer film, and is provided with appropriate reflectivity with respect to the image light. Specifically, the light guiding member 420p includes a transmissive reflective surface that covers the front of the eyes when worn by the observer.

The light transmitting member 450 is integrally fixed with the light guiding member 420p, thus configuring the single light-guiding device 420, and is a member (auxiliary optical block) that assists the see-through function of the light guiding member 420p. The light guiding member 450, which is a light transmitting portion, has a first transmission surface S51, a second transmission surface S52, and a third transmission surface S53 as side surfaces having an optical function. The second transmission surface S52 is disposed between the first transmission surface S51 and the third transmission surface S53. The first transmission surface S51 is on an extended surface of the first surface S11 of the light guiding member 420p, the second transmission surface S52 is a curved surface that is joined to and integrated with the second surface S12, and the third transmission surface S53 is on an extended surface of the third surface S13 of the light guiding member 420p. In other words, the first surface S11 and the first transmission surface S51 are adjacent to each other, and similarly, the third surface S13 and the third transmission surface S53 are adjacent to each other, and both are aligned to be flush with each other and form a smooth surface.

An outline explanation of the optical path of the image light GL will be given below with reference to FIG. 17. The light guiding member 420p causes the image light GL from the projection lens 430 to be incident, and guides the image light GL toward the eye of the observer, by reflecting the image light GL using the first to fifth surfaces S11 to S15 and the like. Specifically, the image light GL from the projection lens 430 is first incident on the fourth face S14 and reflected by the fifth face S15, is incident again from the inner side on the fourth surface S14 and is totally reflected, is incident on and totally reflected by the third surface S13, and is incident on and totally reflected by the first surface S11. The image light GL totally reflected by the first surface S11 is incident on the second surface S12, is partially reflected while partially passing through the half mirror layer provided on the second surface S12, and is once more incident on and passes through the first surface S11. The image light GL that has passed through the first surface S11 is incident, as a substantially parallel luminous flux, on the eye of the observer or an equivalent position. In other words, the observer observes the image formed by the image light GL as the virtual image.

Further, as described above, the light-guiding device 420 allows the observer to visually recognize the image light using the light guiding member 420p, and also, due to the light guiding member 420p and the light transmission member 450 operating in conjunction, causes the observer to observe the external world image having little distortion. At this time, since the third surface S13 and the first surface S11 are substantially parallel to each other (diopter is approximately 0), almost no aberration or the like occurs in the external world light. Further, similarly, the third transmission surface S53 and the first transmission surface S51 are planes that are substantially parallel to each other. Furthermore, since the third transmission surface S53 and the first surface S11 are planes that are substantially parallel to each other, almost no aberration or the like occurs. As described above, the observer observes the external world image that has no distortion through the light transmission member 450.

As described above, in the present embodiment, in the interior of the light guiding member 420p, the image light from the image display device 410 is guided by being reflected five times, from the first surface S11 to the fifth surface S15, including being totally reflected at least two times. As a result, both the display of the image light and the see-through perspective that causes the external world light to be visually recognized can be achieved, and aberration correction of the image light GL can be performed.

In the above-described configuration, in the present embodiment, as illustrated by an arrow A2, by having, as the posture adjustment mechanism, the mechanism (not illustrated) that causes parallel translation of the image display device 410 in the x direction along the light emission surface 441a that is the image surface, the display position of the video image can be changed, as illustrated by a partially enlarged diagram. Note that various modes are possible for the mechanism that causes the parallel translation of the image display device 410, and it is conceivable to adopt a configuration in which the image display device 410 is moved manually or automatically by providing a sliding mechanism, for example.

Note that although an illustration and description thereof have been omitted, the second display device for the left eye and the like have a similar configuration. Specifically, in the case of the present embodiment, the posture adjustment can be performed independently for the left and the right in the left-right direction (the X direction).

Further, the direction in which the parallel translation of the image display device 410 is caused may be the parallel translation in the y direction so as to perform the posture adjustment in the up-down direction (the Y direction) independently for the left and the right.

Further, in the above description, the image display device 410 is subject to the parallel translation, but the same situation as described above may be created by preparing the image display device 410 having a large size in advance, for example, and changing an illumination range of the light emitting surface 411a.

As described above, in the head-mounted display apparatus 400 according to the present embodiment also, the mutually different display content can be visually recognized in the first and second display devices as the first and second video images. Further, by causing the display positions of the first and second video images to be changeable by the first and second posture adjustment mechanisms, which are the posture adjustment mechanism, the optical performance and miniaturization can be maintained while increasing the displayed information amount by separately displaying various information, in comparison to the case in which the image of a single size is visually recognized by both eyes, for example. In particular, in the case of the present embodiment, the display modes of the first and second video images can be changed by the parallel translation of the image display device 410.

Further, it is also conceivable to provide a rotatable mechanism having the type of configuration exemplified in the first to third embodiments for the first and second display devices having the configuration including the light-guiding device configured by the light guiding member and the light transmitting member, as in the above-described mode. Furthermore, in the first and second display devices having the configuration exemplified in the first to third embodiments, the image display device may be subject to the parallel translation.

Furthermore, the mechanism causing the parallel translation of the image display device may be combined with the rotation mechanism of the main frame and the subframes. In this case, each of movable ranges can be adjusted.

Other

The present disclosure is not limited to the embodiments described above, and can be implemented in various aspects, insofar as the aspect does not depart from the spirit and the scope of the disclosure.

Figure 18:
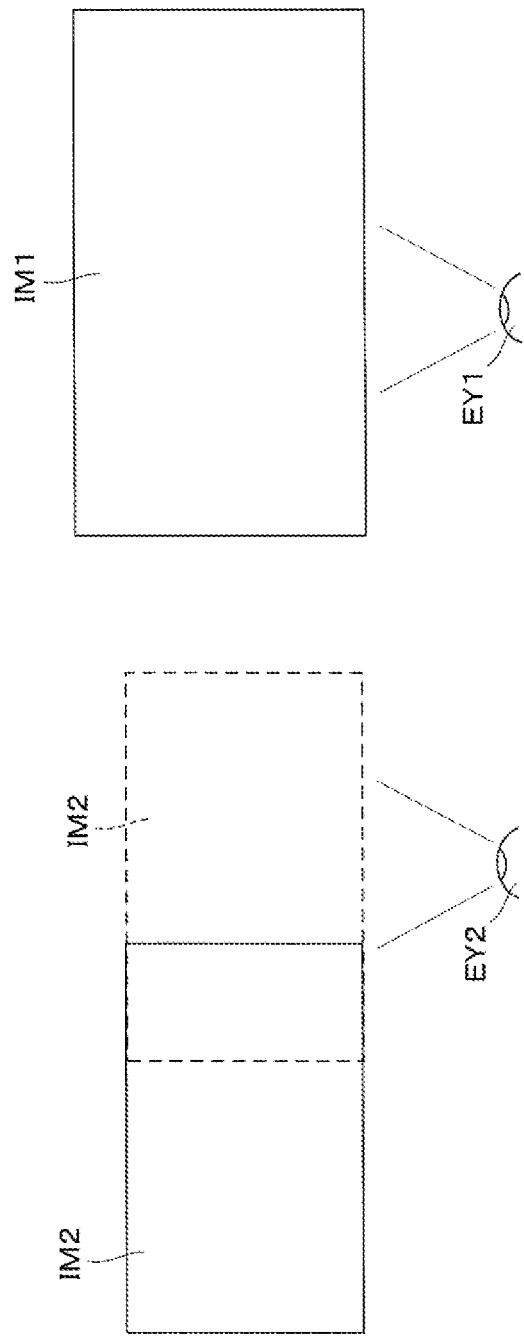
FIG. 18 is a conceptual diagram illustrating the video region recognized by stereoscopic vision in the head-mounted display device according to a modified example.

For example, in the above description, the first and second display devices are the same on both the left and right as a pair, but as illustrated in FIG. 18, for example, one of the video images may be larger than the other, or only one of the images may be configured to be repositionable. Furthermore, it is also conceivable that one of the display regions is horizontally long and the other is vertically long.

Figure 19:
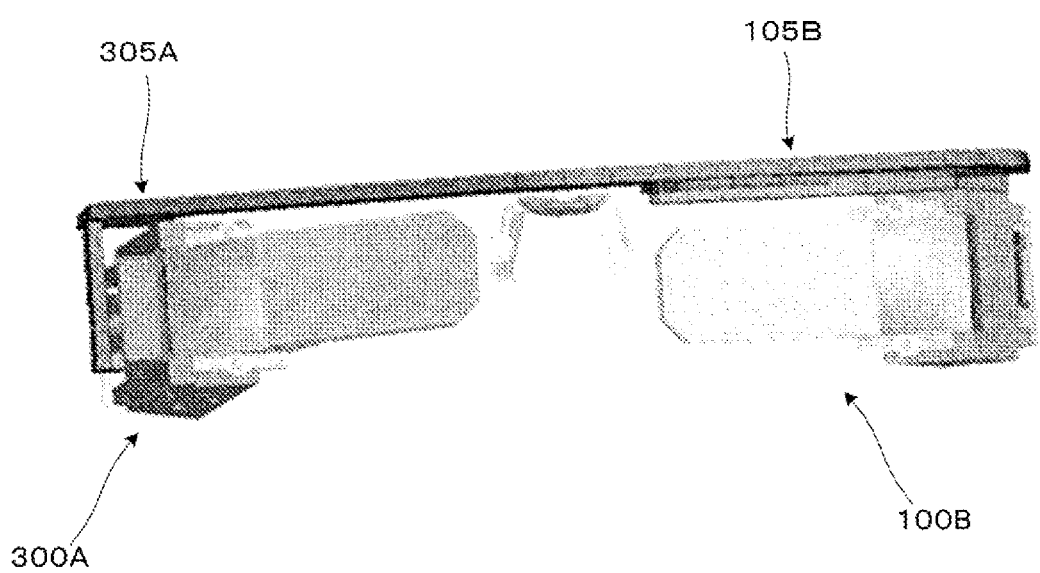
FIG. 19 is a conceptual perspective view illustrating an example of the head-mounted display device according to another modified example.

Furthermore, as illustrated in FIG. 19, for example, a configuration may be employed in which, for the left eye, the image can be moved in the horizontal direction in which the eyes are aligned side by side (the X direction), that is to the left and to the right, while, for the right eye, the image can be moved up and down. Furthermore, it is also conceivable for the image to be movable in the up, down, left and right directions, as if moving on a spherical surface with respect to the center of the pupil.

Additionally, in each of the embodiments, various devices other than the devices described above can be used as the image display device 10 and the like, such as an HIPS as a transmissive liquid crystal display device. For example, a configuration using a reflective liquid crystal display device can also be employed, or a digital micro-mirror device and the like can also be used in place of the video display element formed by the liquid crystal display device and the like.

Further, in the above description, in FIG. 11, for example, the control device CR is connected to the body 100$p$ by the cable 40, and the control device CR and the body 100$p$ are provided as separate bodies, but some or all of the control device CR may be integrated with the body 100$p$, for example. Alternatively, the control device CR and the main body unit 100$p$ may exchange information via wireless communication without passing through the cable 40.

Additionally, the techniques of the present disclosure may be employed in a so-called closed-type (not see-through type) virtual image display device configured to make only image light visually recognized. In addition, the techniques of the present disclosure may also be employed in a device enabling an observer to visually recognize or observe an external world image in a see-through manner, and may be applied to a so-called video see-through product including a display device and an image device.

Additionally, the techniques of the present disclosure are applicable to a binocular type hand held display or the like.

In addition, in the case of the above-described modes, in the generation of the image information VV1 and VV2 as image signals by the display control unit 150, it is conceivable to include various types of information, such as information relating to the resolution of the image.

Additionally, in the above description, in the fourth embodiment, with respect to the location at which the semi-transmissive reflective film, which transmits a part of the image light and reflects another part of the image light, is provided, it is conceivable that a similar role is achieved by providing, for example, an optical function surface formed by a diffraction element such as a volume hologram or the like, in place of the semi-transmissive reflective film.

In addition, in the above description, for example, in the engagement of the groove DT and the projection TP illustrated in FIG. 4 to FIG. 6, a configuration can be employed in which the engagement can be fixed at a desired location of the arc-shaped rotation. Thus, for example, it is possible to have a configuration having a sliding surface used for a method of fixing the position in the movement, or a configuration in which a plurality of convex and concave groove structures are provided on one of the groove portion DT and the protruding portion TP, and a pressing structure formed by an elastic material is provided on the other of the groove DT and the protruding portion TP, and the fixing is possible by pressing the pressing member into each of the convex and concave groove positions.

Figure 20:
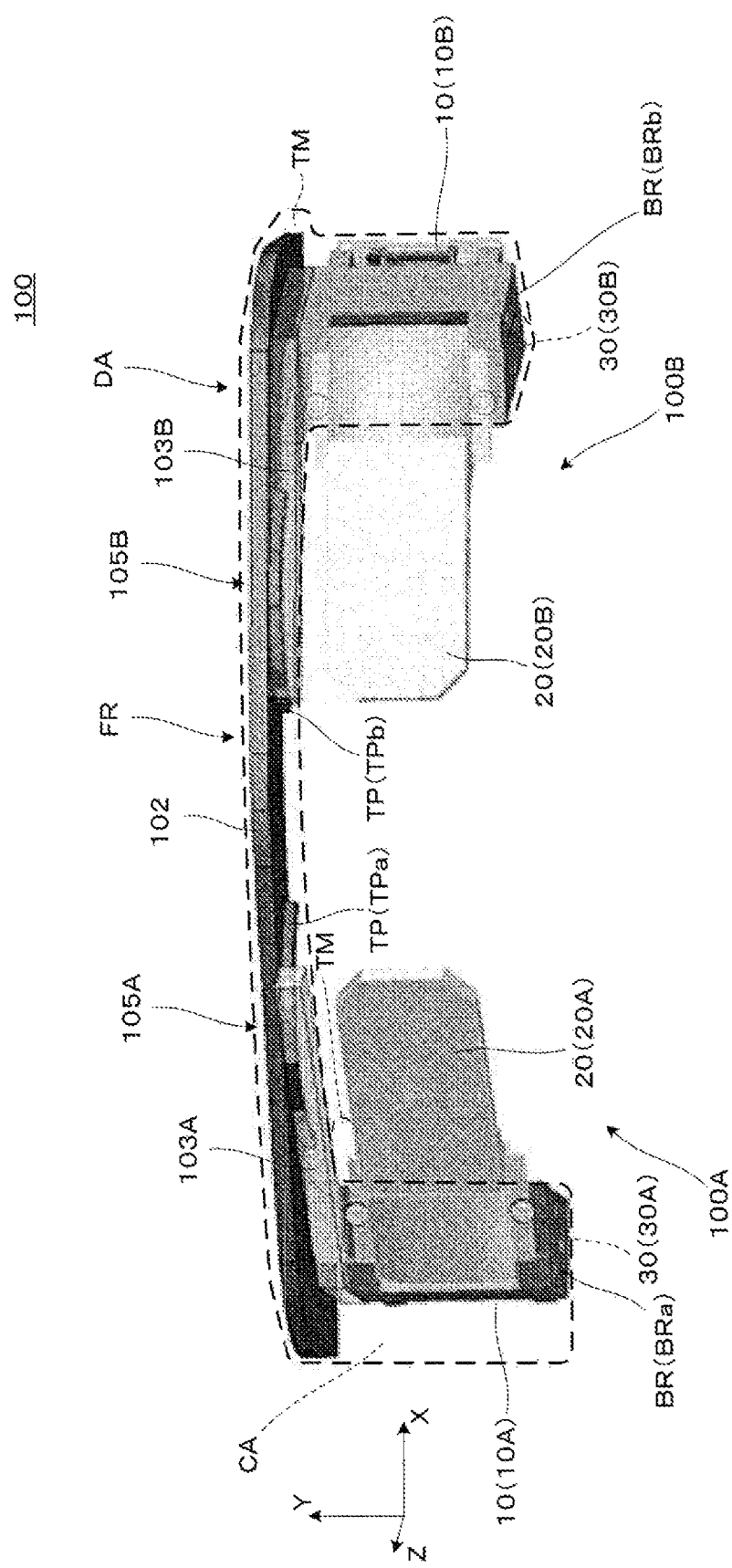
FIG. 20 is a conceptual perspective view illustrating an installation location of an outer member and a temple portion of the head-mounted display device.

Note that, in FIG. 1, an illustration of the cover-shaped outer packaging member (the case member) and the temple portions (temples) is omitted. However, it is conceivable that an outer packaging member CA and temple portions (temples) TM be provided in positions as schematically illustrated by dashed lines in FIG. 20. Also, depending on the shape of the outer packaging member CA and the temple portions TM, in addition to the eyeglasses type, it is conceivable to have a variety of head-mounted configurations, such as a goggle type or a helmet type.

As described above, a head-mounted display device according to an aspect of the present disclosure includes a display mechanism including a first display device and a second display device configured to display a first video image and a second video image having mutually different display contents, and a posture adjustment mechanism configured to change a display position of a video image corresponding to one of the first video image and the second video image, by adjusting a posture of at least one of the first display device and the second display device.

In the above-described head-mounted display device, in the first display device and the second display device configuring the display mechanism, the first video image and the second video image having the mutually different display content can be visually recognized. Further, by allowing the display position of the video image to be changeable by the posture adjustment mechanism, an optical performance and miniaturization can be maintained while increasing a displayed information amount by separately displaying various information, in comparison to a case in which an image of a single size is visually recognized by both eyes, for example.

In a specific aspect of the present disclosure, the posture adjustment mechanism includes a first posture adjustment mechanism configured to change the display position of the first video image by adjusting the posture of the first display device, and a second posture adjustment mechanism configured to change the display position of the second video image by adjusting the posture of the second display device. In this case, the display position of the first video image and the display position of the second video image can be separately changed.

In another aspect of the present disclosure, the first posture adjustment mechanism and the second posture adjustment mechanism change the display position of the first video image and the display position of the second video image over a range in which the display positions are separated. In this case, superimposition of the display position of the first video image and the display position of the second video image can be avoided.

In yet another aspect of the present disclosure, the first display device and the second display device display the first video image and the second video image in a display position outside of a front position. In this case, for example, a front external world view can be secured.

In yet another aspect of the present invention, the posture adjustment mechanism adjusts the posture of the display mechanism so as to change an angle of a principal ray of image light of a video image, a display position of which is to be changed, while maintaining a passage of the principal ray through a center position of an eyebox. In this case, the display position of the video image can be changed while securing a virtual visible range by an observer.

In yet another aspect of the present invention, the posture adjustment mechanism rotates the display mechanism by an angle that is equal to or greater than half an angle of view of the video image for which the display position is to be changed.

In this case, a sufficient position change can be made to the angle of view of the video image.

In yet another aspect of the present invention, the posture adjustment mechanism is a connection mechanism between a main frame fixed on an observer side, and a subframe supported movably with respect to the main frame. In this case, since the subframe is movable with respect to the main frame, the display position can be changed, and it is possible to function as the posture adjustment mechanism.

In yet another aspect of the present invention, the posture adjustment mechanism includes a groove portion extending in an arc shape, and the display mechanism rotationally moves along the shape of the groove portion. In this case, the display position of the video image can be changed by rotationally moving the first and the second display devices configuring the display mechanism along the shape of the groove portion.

In yet another aspect of the present invention, the posture adjustment mechanism includes an arc surface, and the display mechanism rotationally moves along the arc surface. In this case, the display position of the video image can be changed by rotationally moving the first and the second display devices configuring the display mechanism along the arc surface.

In yet another aspect of the invention, the display device includes a display element configured to emit from an image surface, and the posture adjustment mechanism translates the display element along the image surface. In this case, the display position of the video image can be changed by performing the parallel translation of the image element along the image plane.

In yet another aspect of the present invention, the posture adjustment mechanism rotationally moves the display mechanism, with an axial direction thereof being a normal line direction of a horizontal surface including the horizontal direction along an alignment of eyes of an observer at a time of observation. In this case, the display position of the video image can be changed in a direction along the alignment of the eyes of the observer.

In yet another aspect of the present invention, the posture adjustment mechanism rotationally moves the display mechanism, with an axial direction thereof being the horizontal direction along an alignment of eyes of an observer at a time of observation. In this case, the display position of the video image can be changed in the up-down direction perpendicular to the direction along the alignment of the eyes of the observer.

What is claimed is:

1. A head-mounted display device comprising:
   a display mechanism including a first display device and a second display device configured to display a first video image and a second video image having mutually different display contents; and
   a posture adjustment mechanism configured to, by adjusting a posture of at least one of the first display device and the second display device, change a display position of a corresponding one of the first video image and the second video image;
   a main frame fixed on an observer side, the main frame extending in a horizontal direction along an alignment of eyes of an observer at a time of observation;
   a subframe including a first subframe and a second subframe supported movably with respect to the main frame,
   wherein the main frame is connected to both the first display device and the second display device via the first subframe and the second subframe, respectively, and
   wherein the posture adjustment mechanism is a connection mechanism including: a first posture adjustment mechanism disposed between the main frame and the first subframe; and a second posture adjustment mechanism disposed between the main frame and the second subframe.

2. The head-mounted display device according to claim 1, wherein
   the first posture adjustment mechanism is configured to change the display position of the first video image by adjusting the posture of the first display device, and the second posture adjustment mechanism is configured to change the display position of the second video image by adjusting the posture of the second display device.

3. The head-mounted display device according to claim 2, wherein
   the first posture adjustment mechanism and the second posture adjustment mechanism change the display position of the first video image and the display position of the second video image over a range in which the display positions are separated.

4. The head-mounted display device according to claim 2, wherein
   the first display device and the second display device display the first video image and the second video image in a display position outside of a front position.

5. The head-mounted display device according to claim 1, wherein
   the posture adjustment mechanism adjusts a posture of the display mechanism so as to change an angle of a principal ray of image light of a video image, a display position of which is to be changed, while maintaining a passage of the principal ray through a center position of an eyebox.

6. The head-mounted display device according to claim 1, wherein
   the posture adjustment mechanism rotates the display mechanism by an angle that is equal to or greater than half an angle of view of the video image a display position of which is to be changed.

7. The head-mounted display device according to claim 1, wherein
   the posture adjustment mechanism includes a groove portion extending in an arc shape, and
   the display mechanism rotationally moves along the shape of the groove portion.

8. The head-mounted display device according to claim 1, wherein
   the posture adjustment mechanism includes an arc surface, and
   the display mechanism rotationally moves along the arc surface.

9. The head mounted display device according to claim 1, wherein
   the display device includes a display element configured to emit image light from an image surface, and
   the posture adjustment mechanism translates the display element along the image surface.

10. The head mounted display device according to claim 1, wherein
    the posture adjustment mechanism rotationally moves the display mechanism, with an axial direction thereof being a normal line direction of a horizontal surface including a horizontal direction along the alignment of the eyes of the observer at the time of observation.

11. The head mounted display device according to claim 1, wherein
    the posture adjustment mechanism rotationally moves the display mechanism, with an axial direction thereof being a horizontal direction along the alignment of the eyes of the observer at the time of observation.

* * * * *